(12) United States Patent
Chandrasekaran et al.

(10) Patent No.: US 11,399,236 B2
(45) Date of Patent: Jul. 26, 2022

(54) SENSOR DEVICE AND MICROPHONE ASSEMBLY

(71) Applicant: Knowles Electronics, LLC, Itasca, IL (US)

(72) Inventors: Venkataraman Chandrasekaran, Chicago, IL (US); Christian Lillelund, Fredensborg (DK); Claus Erdmann Fürst, Roskilde (DK); Mohammad Shajaan, Værløse (DK)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/920,382

(22) Filed: Jul. 2, 2020

(65) Prior Publication Data

US 2020/0404428 A1 Dec. 24, 2020

Related U.S. Application Data

(63) Continuation of application No. PCT/US2018/068206, filed on Dec. 31, 2018.
(Continued)

(51) Int. Cl.
*H04R 19/04* (2006.01)
*G01L 9/12* (2006.01)
*H04R 3/02* (2006.01)

(52) U.S. Cl.
CPC ............... *H04R 19/04* (2013.01); *G01L 9/12* (2013.01); *H04R 3/02* (2013.01); *H04R 2201/003* (2013.01)

(58) Field of Classification Search
CPC .... H04R 19/04; H04R 2201/003; H04R 3/04; H04R 19/016; H04R 17/02; H04R 3/02; G01L 9/12
(Continued)

(56) References Cited

U.S. PATENT DOCUMENTS 4,845,758 A * 7/1989 Op de Beek .......... H03G 5/005
381/98
10,349,184 B2 7/2019 Kuntzman
(Continued)

FOREIGN PATENT DOCUMENTS

WO 2012122872 9/2012
WO 2017083679 5/2017
(Continued)

*Primary Examiner* — Norman Yu
(74) *Attorney, Agent, or Firm* — Loppnow & Chapa; Matthew C. Loppnow; Roland K. Bowler, II

(57) ABSTRACT

This disclosure provides methods, systems, and apparatuses, for a microphone circuit. In particular, the circuit includes transducer that can sense pressure changes and generate an electrical signal having frequency components in a first frequency range and in a second frequency range higher than the first frequency range. The circuit includes a feedback circuitry that can attenuate frequency components in the first frequency range in the electrical signal and, from it, generate an audio signal. A feedback path circuit includes a low pass filter having a cut-off frequency within the first frequency range, and filters the audio signal to generate a low pass filter signal that includes frequency components in the first frequency range. The low pass filter signal can be used to generate a low frequency pressure signal that corresponds to low frequency pressure changes sensed by the transducer.

19 Claims, 16 Drawing Sheets

Related U.S. Application Data

(60) Provisional application No. 62/613,738, filed on Jan. 4, 2018.

(58) Field of Classification Search
USPC ........ 381/174, 175, 111, 113, 184, 185, 186, 381/369
See application file for complete search history.

(56) References Cited

U.S. PATENT DOCUMENTS

| | | | | |
|---|---|---|---|---|
| 2004/0174991 A1* | 9/2004 | Hirai | ........................ | H04R 3/02 379/406.08 |
| 2005/0115561 A1* | 6/2005 | Stahmann | .............. | A61N 1/365 128/200.24 |
| 2007/0076904 A1* | 4/2007 | Deruginsky | .............. | H03F 1/34 381/95 |
| 2014/0086433 A1* | 3/2014 | Josefsson | ............. | H04R 19/005 381/98 |
| 2014/0153746 A1* | 6/2014 | Nicollini | ................. | H03F 3/005 381/120 |
| 2014/0254835 A1* | 9/2014 | Yakura | ................. | H04R 19/005 381/120 |
| 2015/0158722 A1 | 6/2015 | Lim | | |
| 2015/0281836 A1 | 10/2015 | Nguyen | | |
| 2015/0296305 A1 | 10/2015 | Shao | | |
| 2016/0007119 A1 | 1/2016 | Harrington | | |
| 2016/0037245 A1* | 2/2016 | Harrington | .............. | H04R 1/08 381/111 |
| 2017/0359036 A1* | 12/2017 | Frohlich | ................... | H03F 1/34 |
| 2018/0038746 A1* | 2/2018 | Barnard | ................. | G01N 11/00 |

FOREIGN PATENT DOCUMENTS

| | | |
|---|---|---|
| WO | 2017136744 | 8/2017 |
| WO | 2019136032 | 7/2019 |

\* cited by examiner

SENSOR DEVICE AND MICROPHONE ASSEMBLY

CROSS-REFERENCE TO RELATED APPLICATION

This patent application claims the benefit of and priority to U.S. Provisional Application No. 62/613,738, filed Jan. 4, 2018 and PCT Application Number PCT/US2018/068206 filed Dec. 31, 2019, the content of which are incorporated herein by reference in their entirety.

FIELD OF THE DISCLOSURE

The present disclosure relates generally to microphones, and more particularly to sensing low frequency atmospheric pressure.

BACKGROUND

Several audio sensing applications include electronic microphones. Some such microphones include microelectromechanical systems (MEMS) microphones, e.g., capacitive microphones, the capacitance of which changes as a function of incident changes in pressure. The microphones transform the change in capacitance into corresponding electrical signals. It is desirable to sense a wide range of frequencies. In some implementations, it may be desired to sense both acoustic signals as well as low-frequency pressure signals such as atmospheric or ambient pressure.

DETAILED DESCRIPTION

Figure 1A:
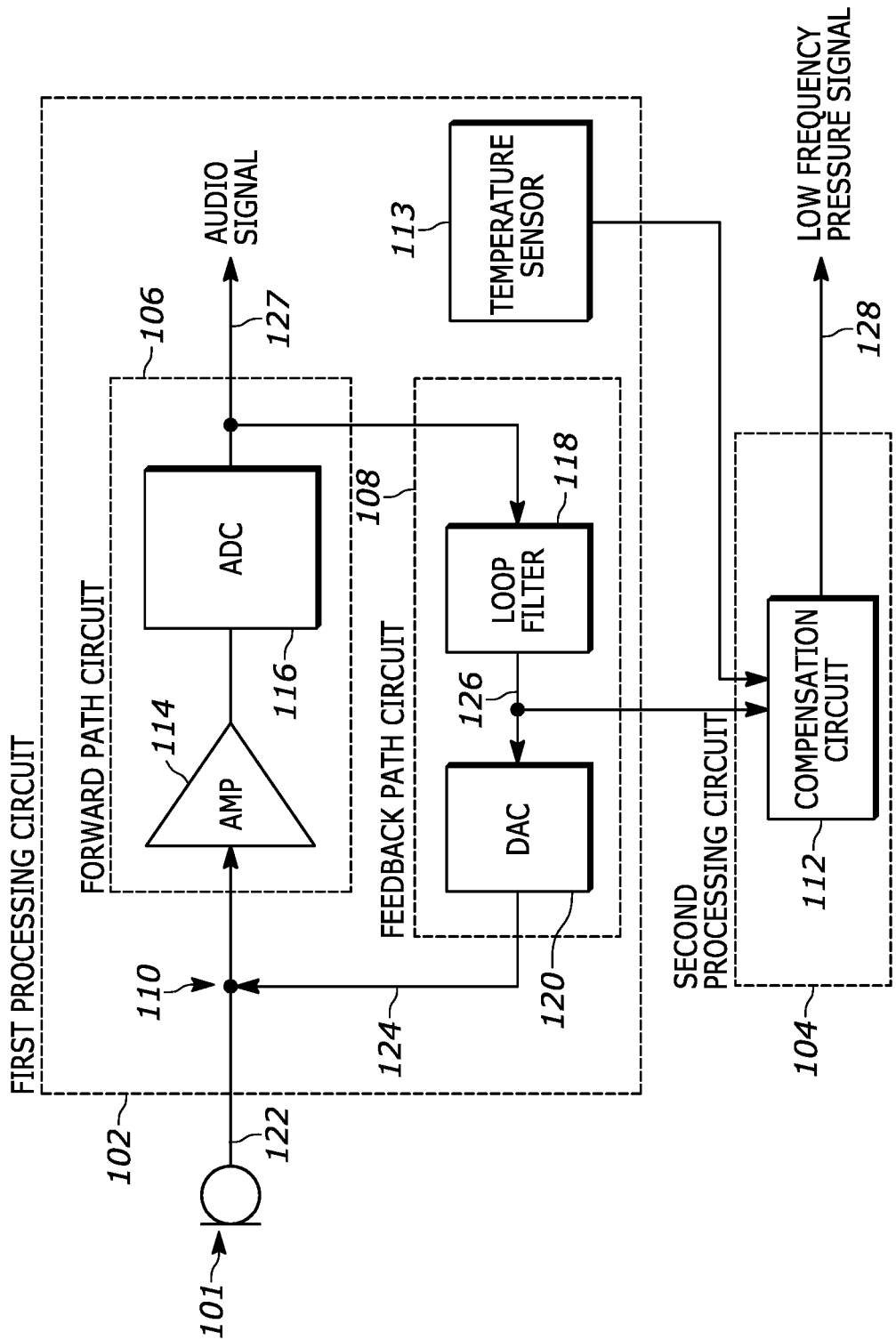
FIG. 1A shows a block diagram of a first example microphone device in accordance with various embodiments.

The present disclosure describes devices and techniques for sensing low-frequency pressure as well as acoustic signals using the same microphone device. The microphone device can include a transducer that is configured to sense pressure changes in an audible or acoustic frequency range as well as at lower frequencies. The transducer can transform the sensed pressure into electrical signals. An electrical circuit can process the electrical signals generated by the transducer and provide an audio signal corresponding to the pressure changes in the audible frequency range and a low frequency pressure signal corresponding to low frequency pressure changes. In some embodiments, the transducer can be implemented using microelectromechanical systems (MEMS) technology or using electret material. In other embodiments, the transducer is embodied as a MEMS piezoelectric, a capacitive transducer, or other transducer. In some embodiments, the transducer can be configured to sense pressure changes in a frequency range of about 1 Hz to about 20 kHz. In some embodiments, the transducer can be configured to sense pressure changes between about 0.1 Pa to about 1 Pa.

In some embodiments, the microphone device, in addition to the transducer, can include a pressure transducer for measuring absolute pressure and pressure changes at frequencies below the frequency range of the transducer. For example, the pressure transducer can be utilized to measure absolute pressure and pressure changes at frequencies in the range from about 0 Hz to about 1 Hz. In some embodiments, the microphone device can combine the electrical signal from the pressure transducer and the low frequency pressure signal generated by the pressure transducer.

The electrical circuit can include a first processing circuit for generating the audio signal and a second processing circuit for generating the low frequency pressure signal. The first processing circuit can include a forward path circuit, a feedback circuit, and a summing node. At the summing node, a feedback signal from the feedback circuit can be used to remove low frequency components from the electrical signal generated by the transducer before the electrical signal is applied to the first processing circuit. The forward path circuit can amplify the electrical signal processed by the canceling circuit to generate the audio signal. The feedback circuit can include a low pass filter that filters the audio signal to generate a low pass filter signal. The feedback circuit can generate the feedback signal based on the low pass filter signal and provide the feedback signal to the summing node. The second processing circuit can process the low pass filter signal to generate the low frequency pressure signal. The first processing circuit and/or second processing circuit may be an integrated circuit implemented as an Application Specific Integrated Circuit (ASIC).

In some embodiments, the second processing circuit, in generating the low frequency pressure signal, can process the low pass filter signal to compensate for non-linearity of the transducer. In some embodiments, the second processing circuit is configured to generate the low frequency pressure signal based on both the low pass filter signal and the audio signal. In some embodiments, the transducer can include a high pass filter having a cut-off frequency below the audible frequency range. In some such embodiments, the second processing circuit can generate the low frequency pressure signal based on compensation for a reduced sensitivity of the transducer below the cut-off frequency. In some embodiments, the canceling circuit can include a summing circuit for subtracting the feedback signal from the electrical signal generated by the transducer before the electrical signal is provided to the forward path circuit. In some other embodiments, the canceling circuit can include a charge pump, coupled to the transducer, where the charge pump can generate charge flow based on the low pass filter signal such that low frequency components in the electrical signal generated by the transducer are attenuated or suppressed.

The forward path circuit can include an analog-to-digital converter (ADC) that can convert the analog audio signal into a digital audio signal. In some embodiments, the low pass filter can filter the digital audio signal to generate a low pass filter signal that also is digital. The feedback circuit can include a digital-to-analog converter (DAC) that can convert the digital low pass filter signal into an analog feedback signal, and provide the analog feedback signal to the canceling circuit.

In some embodiments, the microphone device can include a second pressure transducer used to measure absolute pressure. Generally, for a single pressure transducer to measure absolute pressure, the pressure transducer should have a stiff diaphragm. However, the stiff diaphragm makes small pressure change measurements difficult. To allow small pressure change measurements, the stiff diaphragm may be increased in size, thereby increasing the overall size of the pressure sensor and the package in which it is housed. In the microphone device discussed above, the small pressure changes are instead measured by the transducer, which also measures pressure changes in the audible frequency range. Thus, the second pressure transducer can be dedicated to measuring absolute pressure changes, and can therefore have a relatively smaller size.

FIG. 1A shows a block diagram of a first example microphone device 100. The microphone device 100 includes a transducer 101, a first processing circuit 102, and a second processing circuit 104. The first processing circuit 102 can include a forward path circuit 106, a feedback path circuit 108, and a summing node 110. The second processing circuit 104 includes a compensation circuit 112. The transducer 101 can be configured to sense pressure changes in an audible or acoustic frequency range as well as at lower frequencies. The transducer 101 can transform the sensed pressure into electrical signals. In some embodiments, the transducer 101 can be implemented using microelectromechanical systems (MEMS) technology or using electret material. In other embodiments, other transducer technologies can be used; the present disclosure is not limited to application using MEMS sensors. In some embodiments, the transducer 101 can be configured to sense pressure changes in a frequency range of about 1 Hz to about 20 kHz, or about 0.1 Hz to about 20 kHz. The transducer can be configured to sense pressure changes that have an amplitude below 1 Pa. The first processing circuit 102 and/or second processing circuit 104 may be implemented within an ASIC, in some implementations.

The transducer 101 can generate an electrical signal 122 based on sensed pressure. In particular, the electrical signal 122 can include frequency components corresponding to a first frequency range and a second frequency range, where the first frequency range can correspond to a sub-acoustic frequency range, or a frequency range below a human-audible frequency range, and the second frequency range includes frequencies in the human audible frequency range. For example, the first frequency range can include frequency components having frequencies between about 1 Hz to about 20 Hz or about 0.1 Hz to about 20 Hz, and the second frequency range can include frequency components having frequencies between 20 Hz to about 20 kHz. In some embodiments, the transducer can be implemented using microelectromechanical systems (MEMS) technology or using electret material. In other embodiments, the transducer is embodied as a MEMS piezoelectric or other transducer. In some embodiments, the transducer 101 can be a capacitive transducer.

Figure 1B:
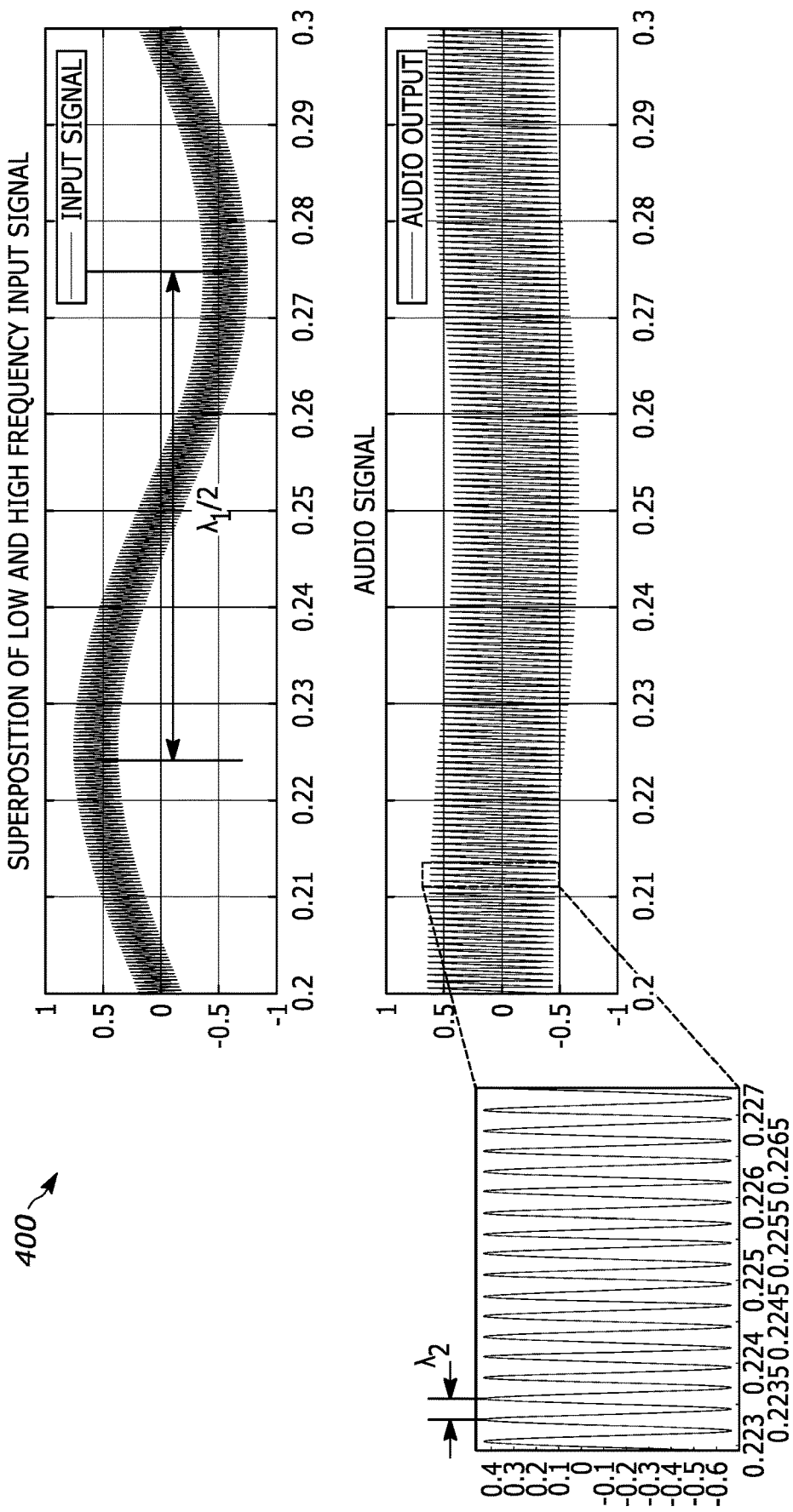
FIG. 1B shows an example electrical signal generated by the first example microphone device shown in FIG. 1A in accordance with various embodiments.

FIG. 1B shows an example electrical signal 400. For example, the example electrical signal 400 can represent the electrical signal 122 generated by the transducer 101 shown in FIG. 1A. The example electrical signal 400 corresponds to pressure changes sensed by a transducer, such as the transducer 101. The pressure changes can include low frequency pressure changes and high frequency pressure changes. The example electrical signal 400 can include a superposition of the frequency components corresponding to these pressure changes. For example, the example electrical signal 400 includes a first frequency component having a first frequency $1/\lambda 1$ and a second frequency component $1/\lambda 2$. The first frequency $1/\lambda 1$. The first frequency $1/\lambda 1$ is less than the second frequency $1/\lambda 2$. For example, the first frequency $1/\lambda 1$ can be within the first frequency range discussed above, while the second frequency $1/\lambda 2$ can be within the second frequency range discussed above.

Referring again to FIG. 1A, the electrical signal 122 is provided to the summing node 110, which precedes the forward path circuit 106. In some embodiments, low frequency components in the electrical signal may saturate amplification circuitry in the forward path circuit 106. To reduce the risk of saturation, the low frequency components in the electrical signal 122 can be attenuated before the electrical signal is fed to the forward path circuit 106. The summing node 110 can receive a feedback signal 124, which includes low frequency components within the first frequency range. The low frequency components can correspond to the low frequency components generated by the transducer 101 (e.g., corresponding to ambient pressure). At the summing node 110 the low frequency components can be removed from the electrical signal 122, thereby resulting in attenuation of the low frequency components in the audio signal, which is provided to an input of the forward path circuit 106. In one or more embodiments, the low frequency components can be attenuated by about 30 dB to about 60 dB.

The forward path circuit 106 can include an amplifier 114 and an analog-to-digital converter (ADC) 116. The amplifier 114 can amplify the amplitude of the audio signal and the ADC 116 can convert the amplified audio signal into a digital audio signal, and provide the digital audio signal at an output of the forward path circuit 106. In some embodiments, the forward path circuit 106 may not include the ADC 116, and can instead provide an analog audio signal at its output. In some embodiments, the forward path circuit 106 also can include filters, level shifters, and/or other processing circuitry for conditioning the audio signal.

The feedback path circuit 108 can include a loop filter (LF) 118 and a digital-to-analog converter (DAC). The LF 118 can include, for example, a low pass filter having a cut-off frequency that can filter the audio signal 127 such that it passes frequency components below the cut-off frequency while blocking frequency component above the cut-off frequency. That is, the LF 118 can generate a low pass filter signal that includes low pass frequency components within the audio signal. In some embodiments, the cut-off frequency can correspond to the lowest frequency in the second frequency range. For example, the cut-off frequency can be about 20 Hz. In some embodiments, the LF 118 can be programmable/customizable, such that the cut-off frequency and the amplitude and phase response of the LF 118 can be changed. In instances where a digital low pass filter is used to implement the LF 118, the values of the coefficients of the digital low pass filter can be changed to change the characteristics, such as the cut-off frequency, the amplitude response, and the phase response, of the LF 118. In one or more embodiments, in particular where the transducer 101 is a capacitive transducer, the LF 118 can have a transfer function or a difference equation that is a constant. Such an LF 118 in combination with the capacitive transducer can form a low pass filter.

The low pass filter signal 126 includes low frequency components of substantially the same frequency and amplitude as the low frequency components generated by the transducer 101. The DAC 120 can convert the digital low pass filter signal 126 into an analog feedback signal 124, and provide the analog feedback signal 124 to the summing node 110.

Figure 2:
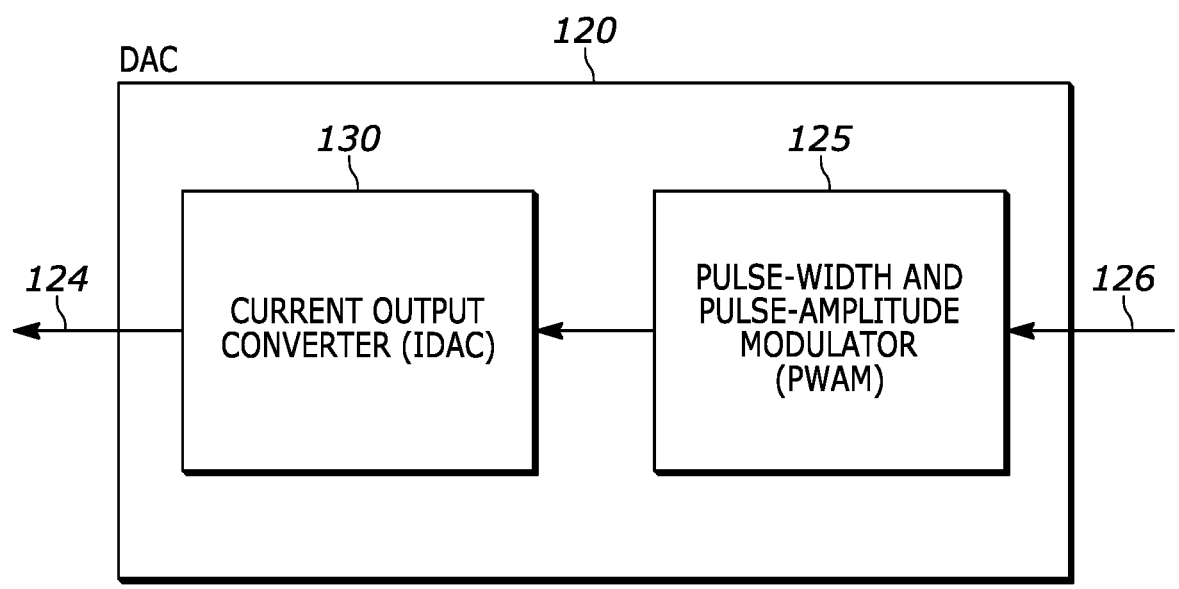
FIG. 2 shows additional details of the digital-to-analog converter shown in FIG. 1A in accordance with various embodiments.

FIG. 2 shows additional details of the DAC 120 shown in FIG. 1A. In particular, the DAC 120 can include a hybrid Pulse-Width and Pulse-Amplitude Modulator (PWAM) 125 connected in series with a current output converter (IDAC) 130. The DAC 120 is configured to convert the low pass filter signal 126 into the corresponding analog feedback signal 124, which is applied to summing node 110. A transducer 101 output may have a high impedance, e.g. a capacitance of about 0.5 pF to about 10 pF. This property of transducers, and the design and electrical properties, in particular output impedance, of the current output converter 130 are discussed in further detail below with reference to the schematic diagram of the converter 130. The application of the analog feedback signal 124 to the transducer 101 output leads to numerous advantages compared with prior art approaches. The direct coupling of the analog feedback signal 124 to the transducer 101 output effectively prevents low-frequency overload of the forward path circuit 106. This is accomplished by the low-pass filtering of the analog feedback signal 124 carried out by the digital loop filter 118, which low-pass filtering cancels or suppresses low-frequency components of the electrical signal 122 at the summing node 110, or input nodes, of the amplifier 114. Furthermore, the noise floor of the microphone device 100 may be lowered by tailoring a frequency response of the transducer 101 to the accurate frequency response of the forward path circuit 106. Furthermore, the accurate control over the frequency response of the forward path circuit 106 improves frequency response matching, including phase matching, between individual microphone devices of a beamforming microphone array which may include two, three, or more microphone devices. This improved response matching leads to improved, predictable and stable directional response of the beamforming microphone array.

Figure 3:
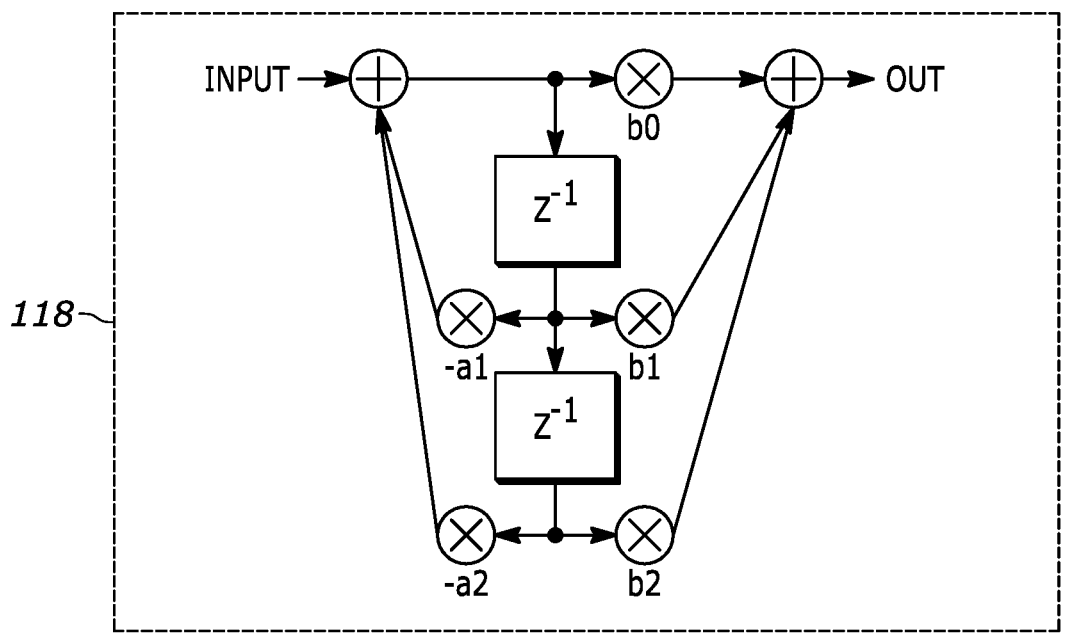
FIG. 3 shows a block diagram of an exemplary digital loop filter in accordance with various embodiments.
Figure 3:
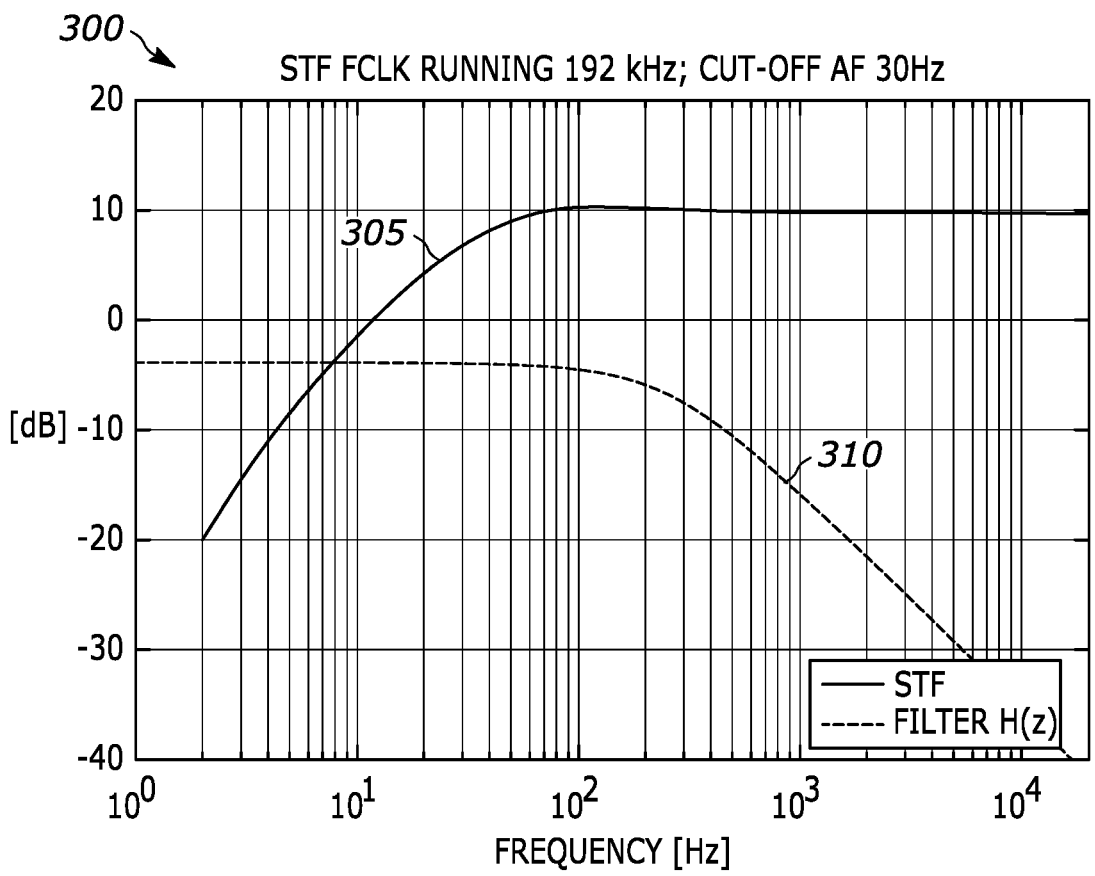

The upper portion of FIG. 3 shows a block diagram of an exemplary embodiment of the previously discussed digital loop filter 118 of the feedback path circuit 108. The digital loop filter 118 has second order low pass filter characteristics using a classical IIR filter bi-quad topology. The skilled person will understand that other digital filter types and topologies, such as FIR filters or other types of IIR filter topologies, may be utilized in alternative embodiments of the digital loop filter 118. Likewise, other filter orders may be used. The transfer function of the illustrated digital loop filter 118 is determined by values of the filter coefficients which include: a1, a2, b0, b1 and b2. The frequency response graph 300 of the lower portion of FIG. 3 shows an exemplary magnitude response 310 of the digital loop filter 118 where the low pass cut-off frequency has been tuned to about 200 Hz. The corresponding magnitude response 305 of the forward path circuit 106 for this particular setting of the response 310 of the digital loop filter 118 is also plotted. The skilled person will notice the expected $2^{nd}$ order high-pass magnitude response of the forward path circuit 106, with a highpass cut-off frequency set to approximately 30 Hz. The skilled person will understand that the lowpass cut-off frequency of the digital loop filter 118 may be adjusted over a broad frequency range to obtain a desired highpass cut-off frequency of the forward path circuit 106. The latter highpass cut-off frequency may be situated in the frequency range between about 1 Hz and about 200 Hz for various embodiments of the microphone device depending on requirements of a specific application. In one or more embodiments, the digital loop filter 118 can be a low pass filter of various orders. For example, the digital loop filter 118 can be a first order low pass filter with one pole and one zero.

The skilled person will understand that certain embodiments of the first processing circuit 102 may include an adjustable or programmable transfer function of the digital loop filter 118 where the transfer function is controlled by filter configuration data. The filter configuration data may include respective values of one or more of the previously discussed filter coefficients a1, a2, b0, b1 and b2. The filter configuration data may be received by the first processing circuit 102 via a command and control interface from a host processor. The programmable transfer function of the digital loop filter 118 allows the microphone assembly to be tailored to requirements of a particular application after manufacturing in a flexible manner and therefore reduces the number of variants needed of the microphone assembly.

Other types of configuration data for various circuits and functions of the microphone device 100 may likewise be programmed through the command and control interface. The configuration data, including filter configuration data, may be stored in rewriteable memory cells (not shown) of the processing circuit, such as flash memory, EEPROM, RAM, register files or flip-flops. These rewriteable memory cells may hold or store certain default values of the filter configuration data.

Figure 4:
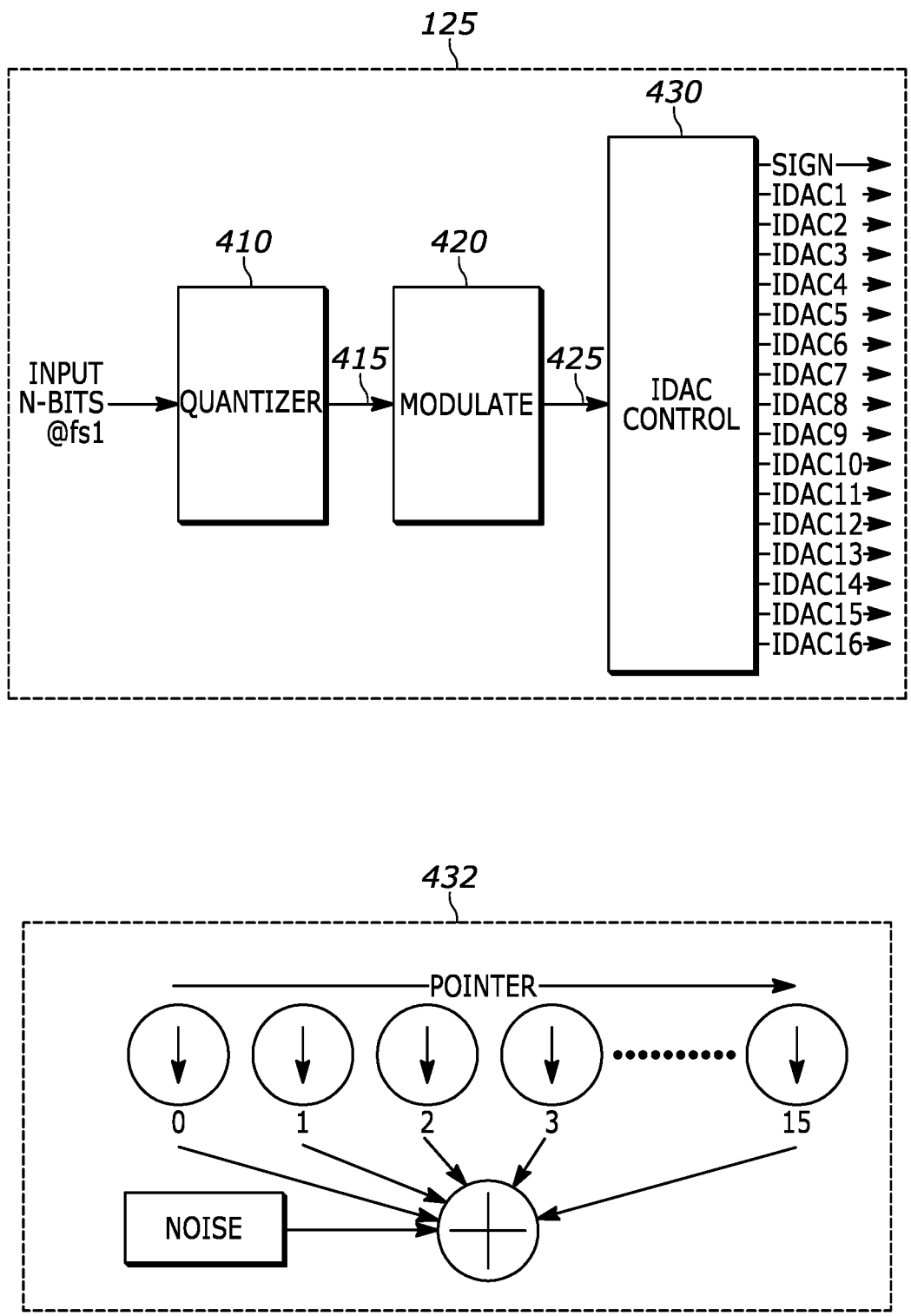
FIG. 4 shows a block diagram of an example Pulse-Width and Pulse-Amplitude Modulator (PWAM) in accordance with various embodiments.

FIG. 4 shows a block diagram of an example Pulse-Width and Pulse-Amplitude Modulator (PWAM) 125. The output of the digital loop filter 118 is connected to the input of the PWAM 125 such that the previously discussed low pass filter signal 126 is applied to the input of the PWAM 125. The low pass filter signal 126 may be a multibit signal with a relatively high resolution—for example between 16 and 32 bits per sample, such as 24 bits per sample, to maintain a high signal resolution through the feedback path circuit 108. The sampling frequency of the first digital feedback signal may lie between 32 kHz and 384 kHz, for example between 96 kHz and 192 kHz. The PWAM 125 includes a noise-shaping up-sampler and quantizer 410 at the input receiving the low pass filter signal 126. The noise-shaping up-sampler and quantizer 410 raises the sampling frequency of the low pass filter signal 126 with a pre-set or programmable ratio—for example an integer ratio between 2 and 16 to generate a digital feedback signal 415 at a second sampling frequency. The noise-shaping up-sampler and quantizer 410 is furthermore configured to quantize samples of the digital feedback signal 415 to a smaller number of bits than the samples of the low pass filter signal 126. According to one exemplary embodiment of the quantizer 410 the samples of the low pass filter signal 126 has 24 bits per sample while the samples of the digital feedback signal have 415 been decimated to 11 bits. These samples may be generated according to a signed sample format where a sign bit takes one bit and a magnitude portion is represented by the residual 10 bits of the sample.

Figure 5:
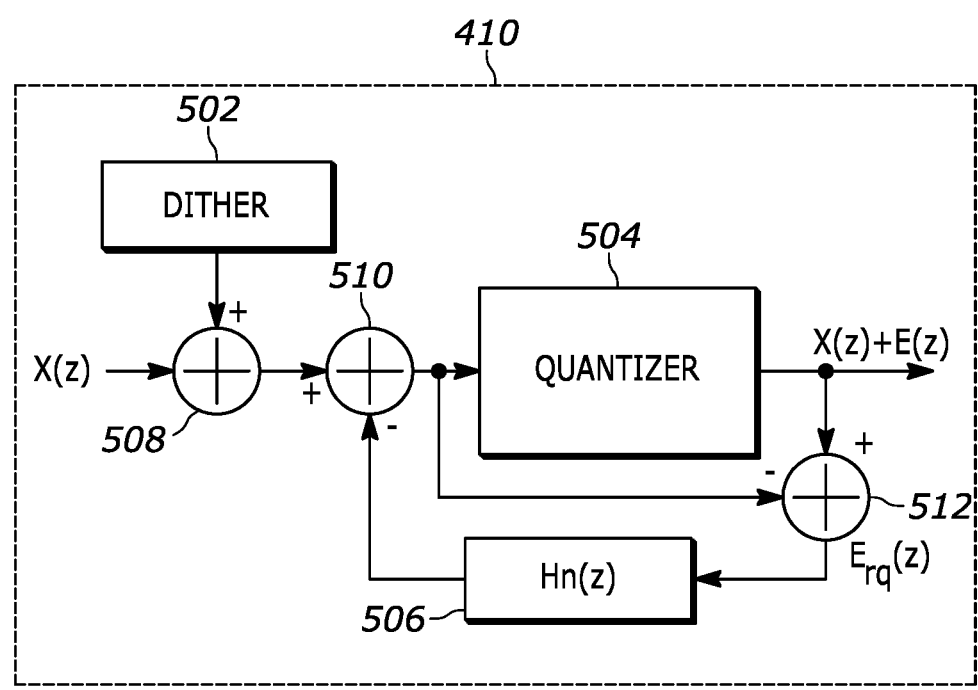
FIG. 5 shows a block diagram of an example noise-shaping up-sampler and quantizer in accordance with various embodiments.

FIG. 5 shows a block diagram of an example noise-shaping up-sampler and quantizer 410 of the PWAM 125. The low pass filter signal 126 is represented by X(z) and the digital feedback signal by X(z)+E(z), where E(z) represents a quantization noise component caused by the quantization operation carried out by the quantizer 504. The noise-shaping up-sampler and quantizer 410 includes a noise-shaping feedback loop extending through loop filter Hn(z) 506 to a second adder 510 on the input side, which adder shapes the spectrum of the generated quantization noise to higher frequencies and therefore maintains a relatively high resolution of the digital feedback signal throughout the audio frequency range despite the quantization. The noise-shaping up-sampler and quantizer 410 may include a feed-forward loop as illustrated extending to an output side summer 512. The noise-shaping up-sampler and quantizer 410 may also include the illustrated Dither generator 502, which adds a pseudo-random noise signal of appropriate level to the first digital feedback signal at the input of the noise-shaping up-sampler and quantizer 410 using a first input side adder 508. This pseudo-random noise signal may reduce audible artefacts associated with the quantization operation in a well-known manner.

Figure 6:
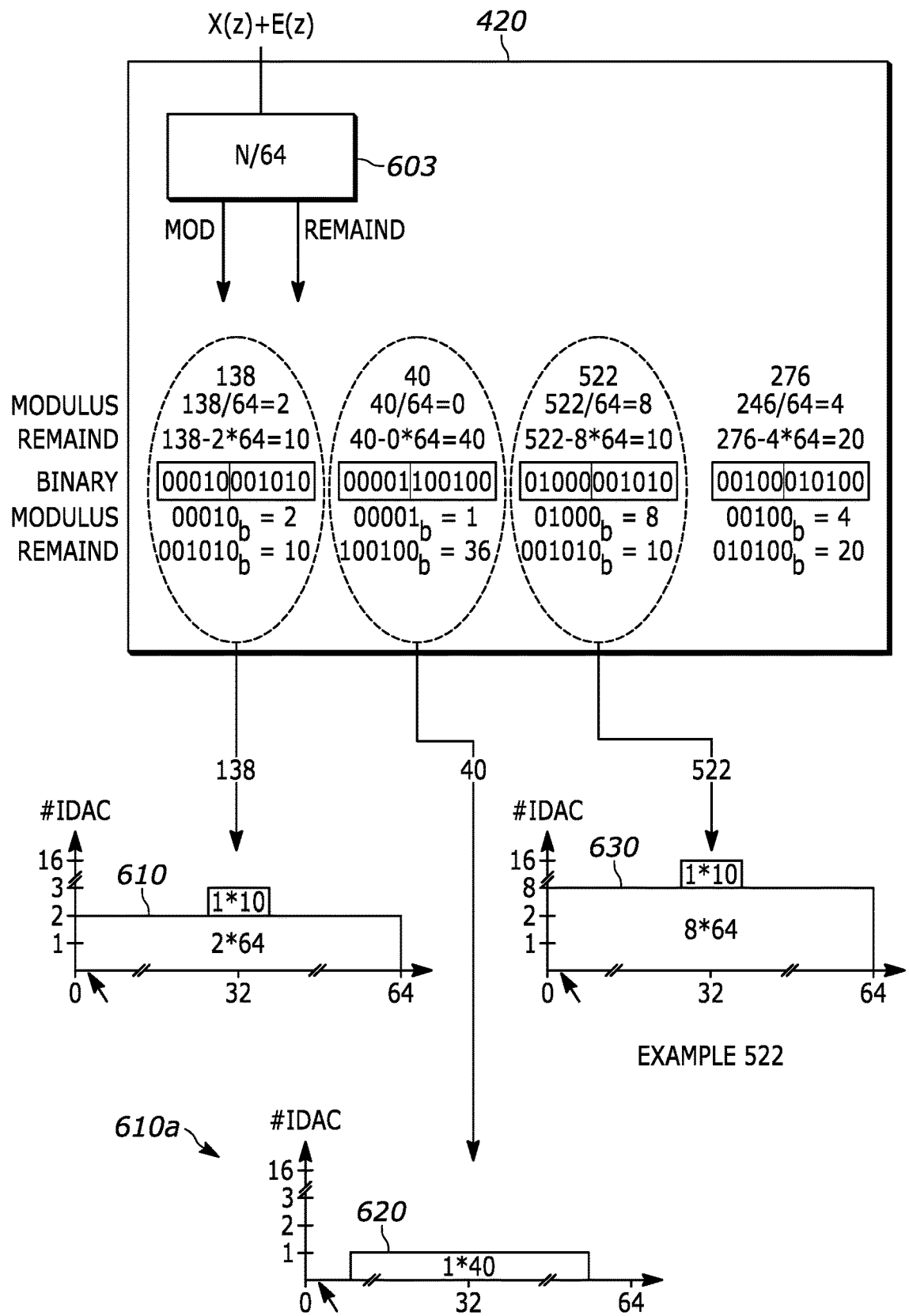
FIG. 6 shows an example block diagram of the operation of a modulator portion of a hybrid Pulse-Width and Pulse-Amplitude Modulator (PWAM) in accordance with various embodiments.

Referring again to FIG. 4, the PWAM 125 additionally includes a modulator 420 connected to the output of the noise-shaping up-sampler and quantizer 410 for receipt of the digital feedback signal 415 (X(z)+E(z)). The operation and functionality of an exemplary embodiment of the modulator 420 is schematically illustrated in FIG. 6. The modulator 420 takes the digital feedback signal (X(z)+E(z)) in the multibit (PCM) format and converts the digital feedback signal into a pulse-width and pulse-amplitude modulated signal. The sampling frequency of this pulse-width and pulse-amplitude modulated signal may be markedly higher than the sampling frequency of the digital feedback signal as discussed below. The sampling frequency of the pulse-width and pulse-amplitude modulated signal 425 may be at least 16 times higher than the sampling frequency of the digital feedback signal, such as 32 or 64 times higher. One embodiment of the modulator 420 accepts a 192 kHz sampling frequency of the digital feedback signal and generates a corresponding pulse-width and pulse-amplitude modulated signal at a sampling frequency of 12.288 MHz, and hence raises the sampling frequency of the latter by an upsampling factor of 64. The pulse-width and pulse-amplitude modulated signal 425 may be applied to a current converter control circuit or block 430—(see, e.g., FIG. 4). The current converter control circuit 430 is configured to convert or transform the pulse-width and pulse-amplitude modulated signal into a corresponding sequence of variable width and amplitude current pulses at the output of the previously discussed current output converter (IDAC) 130 by controlling how individually controllable current generators (illustrated in FIGS. 7 and 8) are activated. The current converter control circuit 430 may include an appropriately configured digital state machine. One embodiment of the current converter control circuit 430 may include a dynamic element matching circuit 432 as schematically illustrated where the selection of individually controllable current generators of the current output converter is carried out in a randomized manner to average out offsets between nominally identical current generators.

Referring again to FIG. 6, the digital feedback signal X(z)+E(z) is applied to the input of the modulator 420 and the sampling frequency raised with a predetermined ratio, N, such as 64. In the present embodiment, the resolution of the second digital feedback signal is 11 bits as discussed previously. A dividing block or circuit 603 divides each 11 bits sample of the digital feedback signal with N to compute respective modulus values and remainder values of the samples. The drawing shows four exemplary values, 138, 40, 522 and 276 using decimal notation, of the 11 bit samples of the digital feedback signal expressed in decimal format initially. The decimal sample value 138 is divided by 64 producing a modulus value of 2 and a remainder value of 10 as illustrated. The corresponding computation is also illustrated for the three remaining samples 40, 522 and 276. The decimal sample value 138 is converted into binary format showing how the modulus value 2 corresponds to 00010b and the remainder value of 10 corresponds to 001010b. A first variable width and amplitude pulse 610 of the pulse-width and pulse-amplitude modulated signal is generated by conversion of the decimal sample value 138. The first variable width and amplitude pulse 610 is essentially constructed from two segments. A first pulse segment (2*64) has an amplitude of "2" (y-axis scale) spanning over a full pulse width, i.e. 100% modulation and pulse amplitude of 2—hence representing the modulus value "2." The first variable width and amplitude pulse 610 additionally includes a second pulse segment (1*10) spanning over merely 10 sample time clocks of the 12.288 MHz sampling frequency of the pulse-width and pulse-amplitude modulated signal. Stated in another way, the decimal sample value 138 is converted into an "analog" variable width and amplitude pulse with a corresponding pulse area.

The conversion of the decimal sample value 40 into the second variable width and amplitude pulse 620 is also illustrated. The decimal sample value 40 leads to a modulus value of 0 and a remainder value of 40 as illustrated. The corresponding, second, variable width and amplitude pulse 620 reflects this outcome by merely including a second pulse segment (1*40) with a "one" amplitude and spanning over merely 40 sample time clocks of the 12.288 MHz sampling frequency of the pulse-width and pulse-amplitude modulated signal. The conversion of the decimal sample value 522 into a third variable width and amplitude pulse 630 is finally illustrated using the same principles outlined above. The skilled person will understand that the modulator 420 is configured to convert incoming sample values into corresponding sequences of variable width and amplitude pulses where the pulse area of each of the variable width and amplitude pulses 610, 620, 630 represents the sample value in question. Hence, each of the variable width and amplitude pulses 610, 620, 630 can be viewed as an analog representation of the sample value in question.

The skilled person will understand that the modulator 420 may be configured to generate the variable width and amplitude pulses following different modulation schemes. In the present embodiment, each of the variable width and amplitude pulses is preferably centered at a midpoint of the pulse period, e.g., centered at the sample clock time 32 in this embodiment using an upsampling factor of 64. This centering is often referred to as a double-edge pulse-width modulation. However, other embodiments of the modulator 420 may be adapted to build the variable width and amplitude pulses by applying single-edge modulation.

Figure 7:
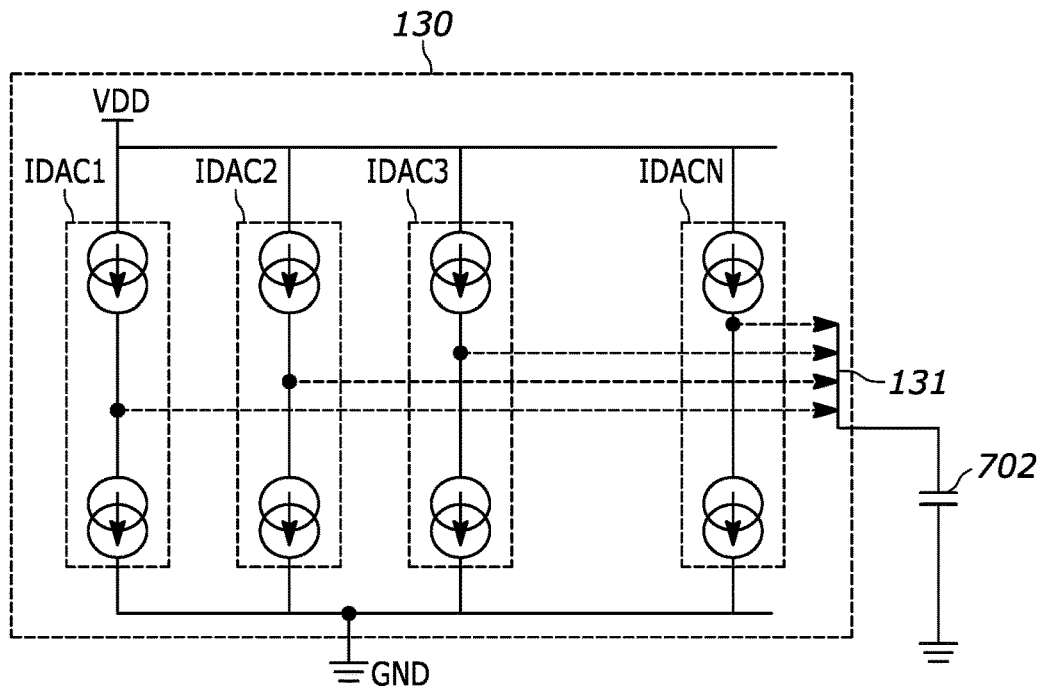
FIG. 7 shows a schematic block diagram of an example current output converter in accordance with various embodiments.

FIG. 7 shows a schematic block diagram of an example current output converter 130. The current output converter 130 includes a predetermined number, N, of individually controllable current generators IDAC1, IDAC2, IDAC3, . . . IDACN, for example between 4 and 32 current generators, such as 16 current generators. The respective outputs of the N individually controllable current generators are connected in parallel to a common DAC output node 131. A capacitive transducer 702 is connected to the common DAC output node 131, which, in turn, can be connected to the summing node 110. The skilled person will understand that the capacitive transducer 702 may include the previously discussed transducer 101 of the microphone device 100 shown in FIG. 1A. However, other types of capacitive transducer elements for sensing of various types of physical variables may in the alternative be driven by the present current mode DAC. The N individually controllable current generators IDAC1, IDAC2, IDAC3, IDACN may be nominally identical, but the skilled person will understand that component variations associated with semiconductor manufacturing may cause minor variations of characteristics between the controllable current generators, in particular current sinking and sourcing capabilities. Each of the N individually controllable current generators IDAC1, IDAC2, IDAC3, IDACN is configured to selectively source current into the capacitive transducer 702 or sink current from the capacitive transducer 702 in accordance with the switching control carried out by the current converter control circuit 430, and thereby charge or discharge voltage across the capacitive transducer 702. Each of the N individually controllable current generators IDAC1, IDAC2, IDAC3, IDACN can be considered a one-bit or 1.5 bit binary values +1 or −1. The sourcing and sinking of the predetermined current amount or level may be carried out by selecting between a first state and second state of the controllable current generator. Finally, each of the individually controllable current generators may include a third state or an idle/zero output state where the current generator neither sources nor sinks current to/from its output. In this idle state, the current generator may be placed in a high-impedance mode effectively disconnecting the current generator from the common DAC output 131 as discussed in further detail below. The skilled person will appreciate that the maximum positive output value of the current converter may correspond to setting all N individually controllable current generators IDAC1, IDAC2, IDAC3, IDACN to source current while the maximum negative output value corresponds to setting all N individually controllable current generators IDAC1, IDAC2, IDAC3, IDACN to sink current.

Figure 8:
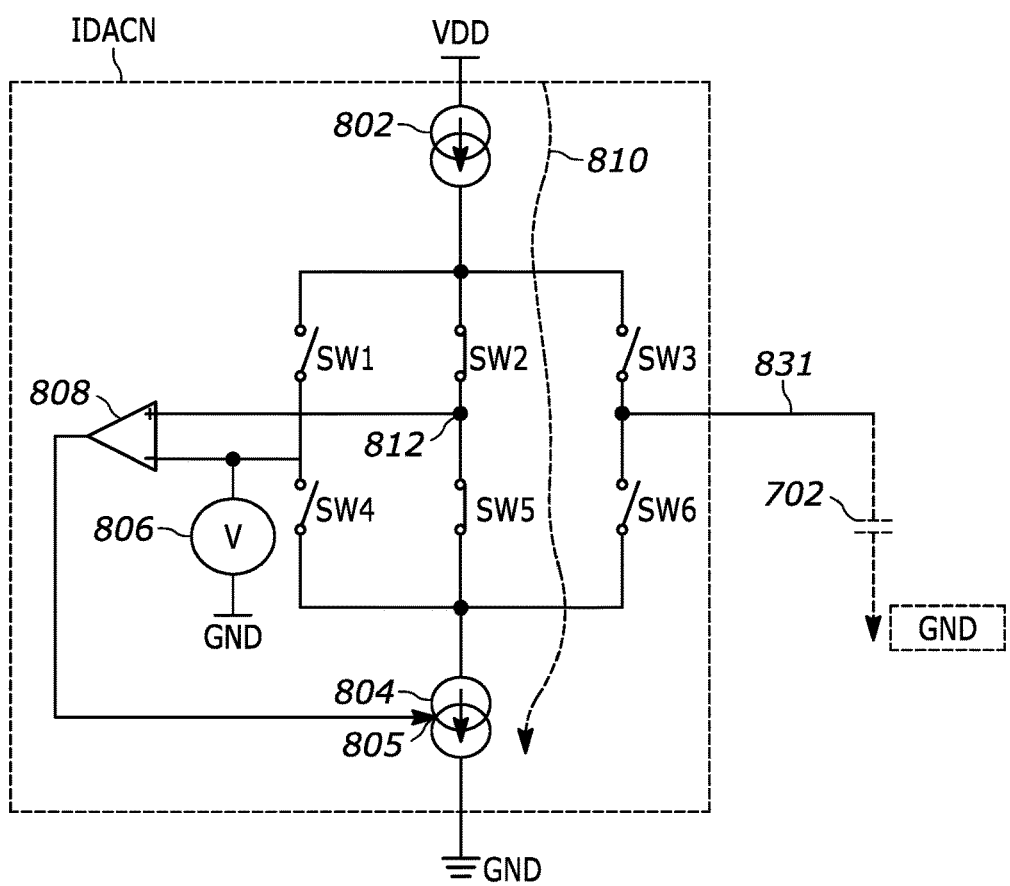
FIG. 8 shows a schematic block diagram of an example controllable current generator IDACN of the current output converter in accordance with various embodiments.

FIG. 8 shows a schematic block diagram of an example controllable current generator IDACN of the current output converter 130 when placed in the idle state or off-state discussed above. The controllable current generator IDACN includes a first current source 802 and a second current source 804 connected in series between the positive DC supply rail VDD and a negative DC supply rail which is ground (GND) in the present embodiment. A first switch pair, including switches SW2 and SW5, is coupled in-between the first and second current sources 802, 804 and is operating in a synchronized manner where both switches are simultaneously closed/conducting or open/non-conducting. The switches of the first switch pair SW2 and SW5 are closed in the idle state while the residual SW1, SW3, SW4 and SW6 are placed in open/non-conducting states as illustrated. This means that the current flowing through the first current source 802 and second current source 804 runs directly from VDD to GND as illustrated by the current path 810. Consequently, each of the first and second current sources 802, 804 is electrically disconnected from the output node 831 and the controllable current generator IDACN does therefore not source or sink any noticeable current to the capacitive transducer 702 when placed in the idle state.

The controllable current generator IDACN additionally includes a DC voltage reference 806 connected to an inverting input of a differential loop amplifier 808, e.g. an operational amplifier or other differential amplifier, of a feedback regulation loop of the IDACN. The voltage of the DC voltage reference 806 may be equal to one-half VDD. The differential loop amplifier 808 has a non-inverting input (+) connected to a midpoint node 812 arranged in-between the first switch pair SW2, SW5. An output of the differential loop amplifier 808 is connected to a control input 805 of the second current source 804 where the control input 805 is configured to adjust the current level of the second current source 804. The operation of the differential loop amplifier 808 therefore seeks to dynamically or adaptively adjust the voltage at the midpoint node 812 to approximately one-half VDD, which is the voltage set at the negative input of the differential loop amplifier 808, by adjusting the current flowing through second current source 804 via the control input 805. This adaptive adjustment of the voltage at the midpoint node 812 is carried out by a feedback regulation loop. Hence, the differential loop amplifier 808, the second current source 804 and the DC voltage reference 806 therefore jointly form a DC error suppression circuit which is configured to match or align the first and second current levels supplied by the first and second current sources 802, 804 during the idle state of the controllable current generator IDACN. In certain embodiments, the differential loop amplifier 808 may possess a relatively small bandwidth, or large time constant, compared to the sampling frequency of the incoming pulse-width and pulse-amplitude modulated signal. The upper cut-off frequency of the differential loop amplifier 808 may, for example, be smaller than 100 kHz, or smaller than 40 kHz, which effectively performs a slow averaging of the current source balancing to secure a long-term zero DC offset at the output of each of the controllable current generators.

This property has several noticeable advantages, for example leading to a linear I/O characteristic of the current output converter 130. The DC error suppression circuit also prevents build-up of DC voltage components on the load, which is a noticeable advantage in connection with driving transducer elements (such as, for example, capacitive transducers) where DC off-sets or DC imbalances of the analog feedback signal will tend to drive the DC operating point of the transducer away from a target DC operating point. This potential build-up of DC off-set is caused by the charge integration carried out by the capacitance of the transducer element. The controllable current generator IDACN is operating in the previously discussed idle state where the output node 831 is in a high-impedance state supplying substantially zero current output. Each of the switches SW1, SW2, SW3, SW4, SW5 and SW6 may include a controllable semiconductor switch for example a MOSFET. Each of the switches SW1, SW2, SW3, SW4, SW5 and SW6 may include a control terminal, for example a gate terminal of a MOSFET, which switches the controllable semiconductor switch between its conducting and non-conducting states. These control terminals are connected to the previously discussed current converter control circuit 430. The current level supplied by the first and second current sources 802, 804 may vary depending on requirements of a particular application such as a load impedance, e.g. the capacitance of the capacitive transducer 702 in the present embodiment, the sampling frequency of the pulse-width and pulse-amplitude modulated signal, the number of parallel connected controllable current generators of the current output converter 130, etc. In one exemplary embodiment of the current output converter 130 comprising 16 controllable current generators, the respective currents of the first and second current sources 802, 804 are set to about 100 pA, e.g. between 50 pA and 200 pA, when configured for driving a 1-4 pF capacitive transducer. The current settings of the controllable current generators generally depend on a dv/dt at the peak amplitude of the analog feedback signal at the highest frequency of interest of the feedback loop. The currents of the controllable current generators should preferably be capable of charging the capacitance of the transducer 101 without slew-induced distortion under these conditions. The highest frequency of interest of the analog feedback signal may lie between 300 Hz and 3 kHz, for example about 1 kHz, in exemplary embodiments of the microphone device 100. An output impedance at 10 kHz of each of the individually controllable current generators IDAC1, IDAC2, IDAC3, IDACN is in some embodiments preferably larger than 1 MΩ, such as larger than 10 MΩ or 100 MΩ, when operating in either the first state or the second state.

Figure 9A:
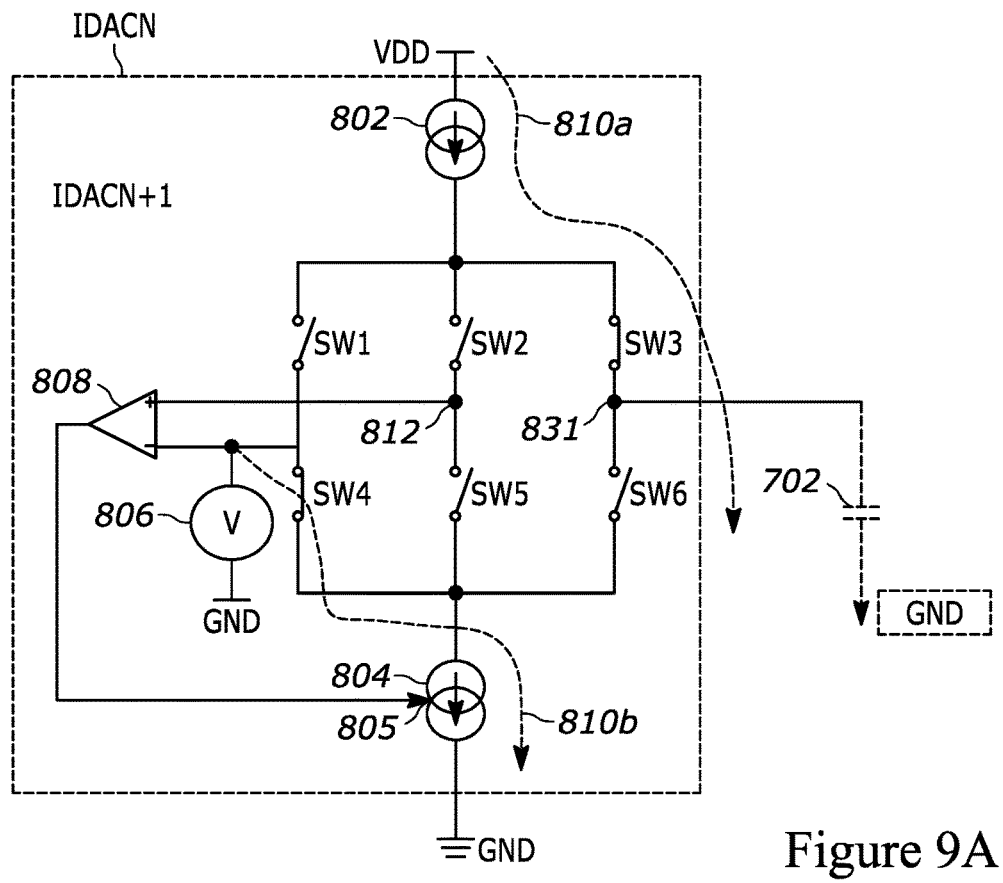
FIG. 9A shows a schematic block diagram of the controllable current generator IDACN of the current output converter when placed in a first state in accordance with various embodiments.

FIG. 9A shows a schematic block diagram of the controllable current generator IDACN of the current output converter 130 when placed in the first state, or +1 state, discussed above where the output 831 is sourcing the predetermined current level to the capacitive transducer 702 or other load circuit. In the first state, the switches of the first switch pair SW2 and SW5 are open or non-conducting and the switches SW1 and SW6 are both open or non-conducting as illustrated. The residual switches SW4 and SW3 are in contrast placed in conducting or closed states as illustrated. This combination of switch states means that the current flowing through the first current source 802 is sourced into the capacitive transducer 702 via current path 810a while the current generated by the second current source 804 runs from the DC voltage reference 806, which may be equal to one-half VDD, directly to GND via the current path 810b. Consequently, the controllable current generator IDACN sources the predetermined current level to the capacitive transducer 702 when placed in the first state. The skilled person will understand that the DC balancing of the current levels of the first current source 802 and the second current source 804 is still maintained by the operation of the previously discussed DC error suppression circuit.

Figure 9B:
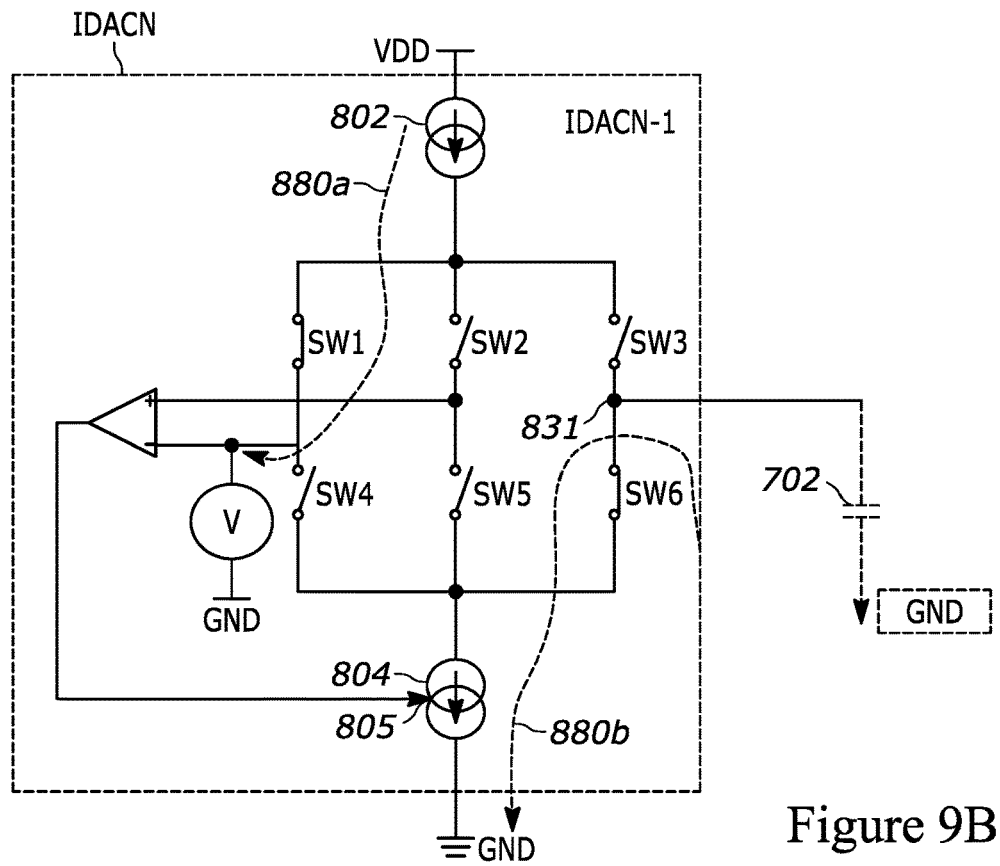
FIG. 9B shows a schematic block diagram of the controllable current generator IDACN of the current output converter 130 when placed in a second state in accordance with various embodiments.

FIG. 9B shows a schematic block diagram of the controllable current generator IDACN of the current output converter 130 when placed in the second state, or −1 state, discussed above where the output 831 is sinking the predetermined current level from the capacitive transducer 702 or other load circuit to discharge the load circuit. In the second state, the switches of the first switch pair SW2 and SW5 are open or non-conducting and the switches SW4 and SW3 are both open or non-conducting as illustrated. The residual switches SW1 and SW6 are in contrast placed in conducting or closed states as illustrated. This combination of switch states means that the current flowing through the first current source 802 is sourced into the DC voltage reference 806 and thereafter to GND via the current path 880a. In contrast, the predetermined current generated by the second current source 804 is drawn out of the capacitive transducer 702 via current path 880b to discharge the capacitive transducer 702. Consequently, the controllable current generator IDACN sinks the predetermined current level from the capacitive transducer 702 when placed in the second state. The skilled person will understand that the DC balancing of the current levels of the first current source 802 and the second current source 804 is still maintained by the operation of the previously discussed DC error suppression circuit.

The skilled person will understand that above outlined switch arrangement and associated switching scheme of the switches SW1, SW2, SW3, SW4, SW5 and SW6 through the first, second and third states of each of the controllable current generators allow the first and second current sources to operate in an un-switched manner even during time periods where they do not source or sink current to the load circuit. Instead, the superfluous current of a particular current generator is directed through the DC voltage reference 806 by selecting an appropriate setting of the switches. This feature eliminates switching noise for example caused by charge injection from repetitious switching of the first and second current sources when cycling through the first, second and third states.

As discussed above in relation to FIGS. 1-9B, the feedback path circuit 108 can generate an analog feedback signal 124, which can attenuate or suppress low frequency components in the electrical signal 122 generated by the transducer 101.

Referring again to FIG. 1A, the second processing circuit 104 receives the low pass filter signal 126 and processes the low pass filter signal 126 to generate a low frequency pressure signal 128. As discussed above, the second processing circuit 104 includes a compensation circuit 112 that can process the low pass filter signal 126 and generate the low frequency pressure signal 128. In particular, the compensation circuit 112 can compensate for a non-linear relationships between a sensitivity of the transducer 101 and the change in frequency as well as changes in temperature.

Figure 10:
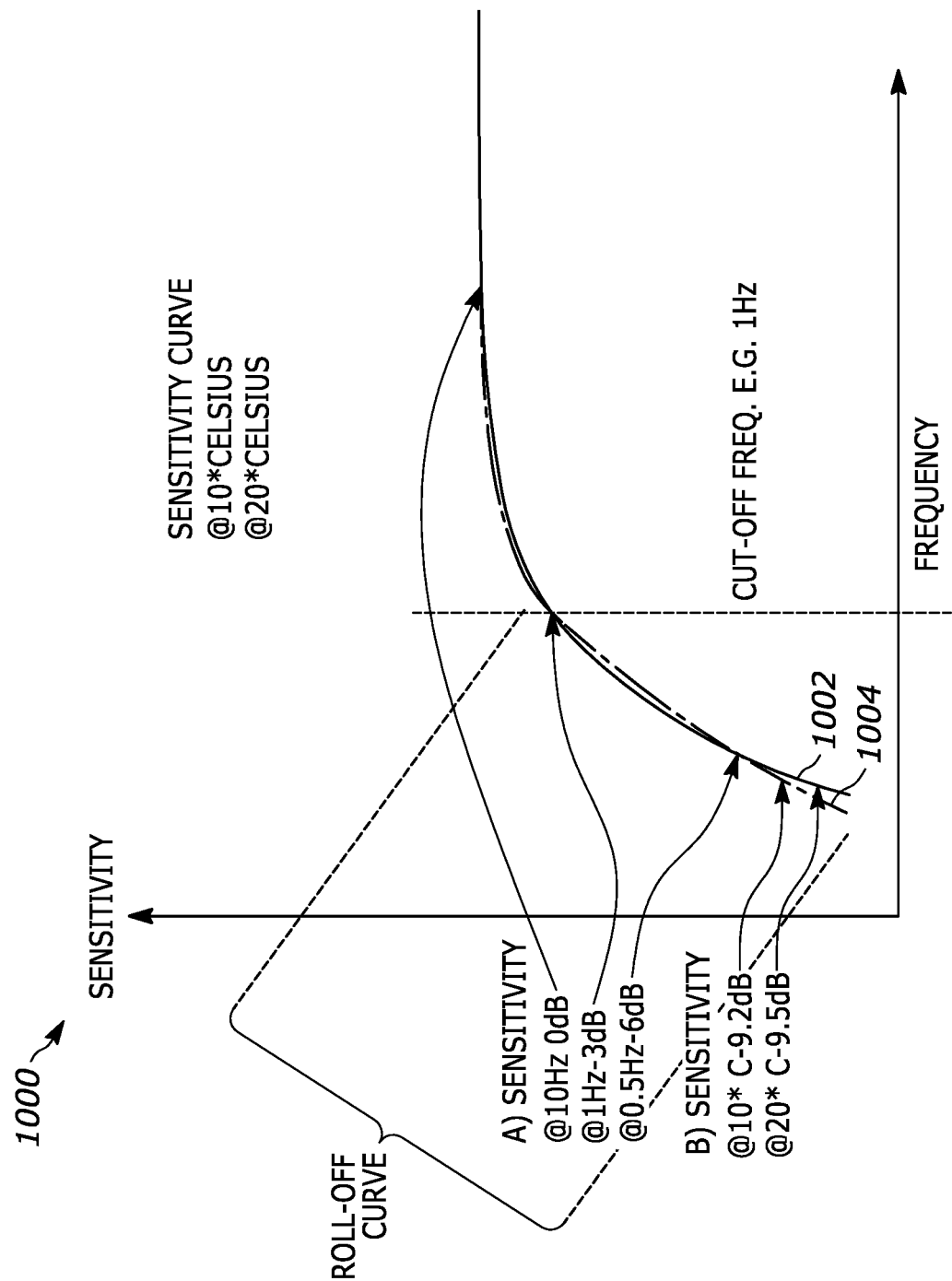
FIG. 10 shows an example graph of the sensitivity of a capacitive transducer at two different temperatures in accordance with various embodiments.

FIG. 10 shows an example graph 1000 of sensitivity of the transducer at two different temperatures. In particular, a first plot 1002 depicts the sensitivity over a frequency range at about 10 degrees Celsius, while a second plot 1004 depicts the sensitivity over the same frequency range at about 20 degrees Celsius. Both the first and second plots 1002 and 1004 show that the sensitivity of the transducer varies non-linearly based on the frequency of the incident pressure change. For example, the sensitivity at 10 Hz is about 0 dB, and about −6 dB at about 0.5 Hz. The sensitivity also changes with the change in temperature, due to, for example, changes in the mechanical stresses imposed on the transducer package as a result of changes in temperature. For example, with the change in temperature from about 10 degrees Celsius to about 20 degrees Celsius, the sensitivity at the same frequency changes from about −9.2 dB to about −9.5 dB. In some embodiments, it is desirable that the sensitivity of the transducer 101 is substantially uniform over an operating frequency range, and an operating temperature range. The compensation circuit 112 can process the low pass filter signal 126 to compensate for the changes in sensitivity over changes in frequency and changes in temperature such that the resulting low frequency pressure signal 128 appears as if it were generated based on a uniform sensitivity transducer.

In some embodiments, the compensation circuit 112 can include a multiplier that multiplies the amplitudes of frequency components of the low pass filter signal 126 within frequency ranges at which the transducer 101 exhibits non-uniform sensitivity. For example, referring to the first and second sensitivity plots 1002 and 1004 shown in FIG. 10, the multiplier can multiply the amplitudes of frequency components of the low pass filter signal 126 that lie in the frequency range where the sensitivity is below 0 dB with appropriate multiplying factors. In some embodiments, the multiplier can determine the appropriate multiplying factor based on a look up table that includes a first column including frequencies, and a corresponding value in another column specifying the multiplying factor. In some other embodiments, a polynomial representing the sensitivity plot of the transducer 101 can be stored in memory, and can be used to determine the multiplying factor. The compensation circuit 112 can similarly compensate for changes in sensitivity with changes in temperature. For example, as shown in FIG. 1A, the microphone device 100 can include a temperature sensor 113 that can measure the temperature of the microphone device 100. The compensation circuit 112 can include a look-up table that lists various multiplying factors corresponding to various temperature values. Based on the temperature value received from the temperature sensor 113, the compensation circuit 112 can determine the appropriate multiplying value from the look-up table. In some embodiment, the look-up tables for frequency compensation can be populated during a calibration process. In some embodiments, the compensation circuit 112 can simultaneously carry out frequency and temperature compensation on the low pass filter signal 126 to generate the low pass filter signal 126.

In some embodiments, the second processing circuit 104 can combine the low pass filter signal 126 and the audio signal 127 to generate the low frequency pressure signal 128. In some embodiments, the second processing circuit 104 can generate the low frequency pressure signal 128 based solely on the audio signal 127 instead of based on the low pass filter signal 126. In some such embodiments, the second processing circuit 104 can include a loop filter similar to the LF 118 to process the audio signal 127 and generate a low pass filter signal, which, in turn, can be processed by the compensation circuit 112 to compensate for changes in frequency and temperature to generate the low frequency pressure signal 128. In some embodiments, the second processing circuit 104 can combine the low pass filter signal 126 and the audio signal 127 to generate the low frequency pressure signal 128 that includes frequency components of both the low pass filter signal 126 and the audio signal 127. For example, if the desired frequency range for the low frequency pressure signal 128 is up to 20 Hz, but the low pass filter signal 126 includes frequency components only up to 10 Hz, then the second processing circuit 104 can filter the frequency components from about 10 Hz to about 20 Hz from the audio signal 127, combine the filtered frequency components with the low pass filter signal 126 and generate the low frequency pressure signal 128.

Figure 11:
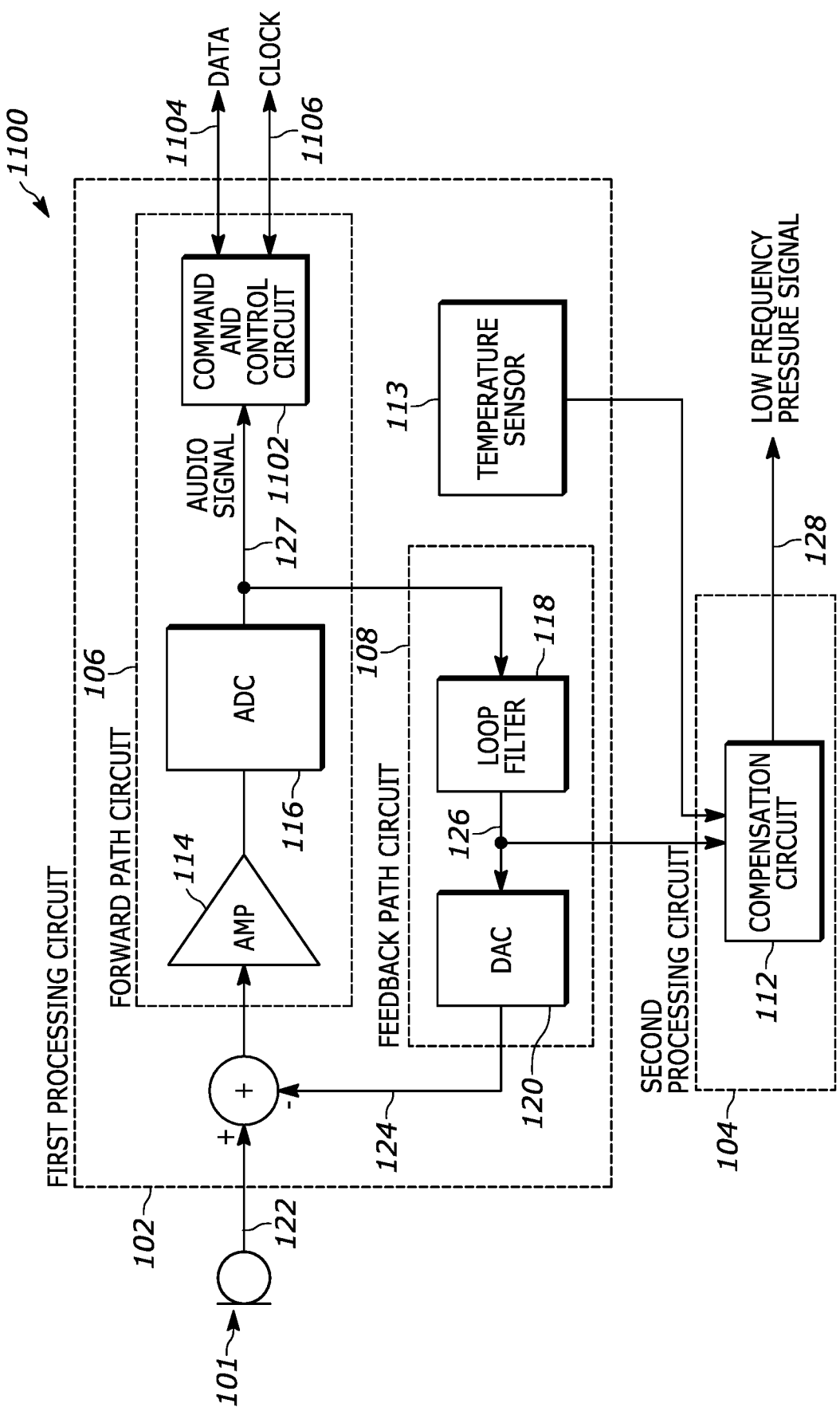
FIG. 11 shows a second example microphone device having a command and control circuit in accordance with various embodiments.

FIG. 11 shows a second example microphone device 1100 having a command and control circuit 1102. The command and control circuit 1102 can be configured to receive commands and filter configuration data for one or more filters (such as the LF 118) from a host processor. The host processor can be a processor associated with a host device in which the second example microphone device 1100 is deployed. The command and control circuit 1102 can include a data line 1104 and a clock line 1106. The command and control circuit can include a standardized data communication interface according to various serial data communication protocols, such as, for example, I²C, Universal Serial Bus (USB), Universal Asynchronous Receiver-Transmitter (UART), SoundWire, and Serial Peripheral Interface (SPI). The command and control circuit 1102 can be configured to encode the audio signal 127 in accordance with the relevant protocol of the data communication interface and provide the encoded audio signal on the data line 1104. The command and control circuit 1102 is also configured to receive commands and filter configuration data over the data line 1104. The clock line 1106 can receive a clock signal provided by the host device for synchronizing the data communication. In some embodiments, the second processing circuit 104 may also include a command and control circuit, similar to the command and control circuit 1102, to receive commands and configuration data for the compensation circuit 112. The command and control interface of the second processing circuit can encode the low frequency pressure signal 128 to generate an encoded low frequency pressure signal, and provide the encoded low frequency pressure signal over the associated data line.

A person skilled in the art will appreciate that at least one or more components of the first processing circuit 102 and the second processing circuit 104 discussed above in relation to FIGS. 1A-11 can be implemented using an ASIC, such as a digital signal processor (DSP). In some such embodiments, the DSP can be used to implement the LF 118 as a digital filter, such as, for example, a finite impulse response (FIR) filter, an infinite impulse response (IIR) filter, etc. In some implementations, values of the coefficients of the digital filter can be stored in a memory of the DSP. The values of the coefficients can be preloaded into the DSP or can be received via the data line 1104 shown in FIG. 11. In one or more embodiments, the at least one or more components of the first processing circuit 102 and the second processing circuit 104 discussed above in relation to FIGS. 1A-11 can be implemented using ASICs, such as hard-wired logical gates or field programmable gate arrays (FPGAs) synthesized using high level hardware description language, such as Verilog or VHDL. The coefficients of various components, such as filters, can be stored in memory (such as read-only memory (ROM) or metal ROM), stored by way of one-time programmable fuses burned during production, or loaded in memory via the command and control interface, such as, for example, via the command and control circuit 1102.

Figure 12:
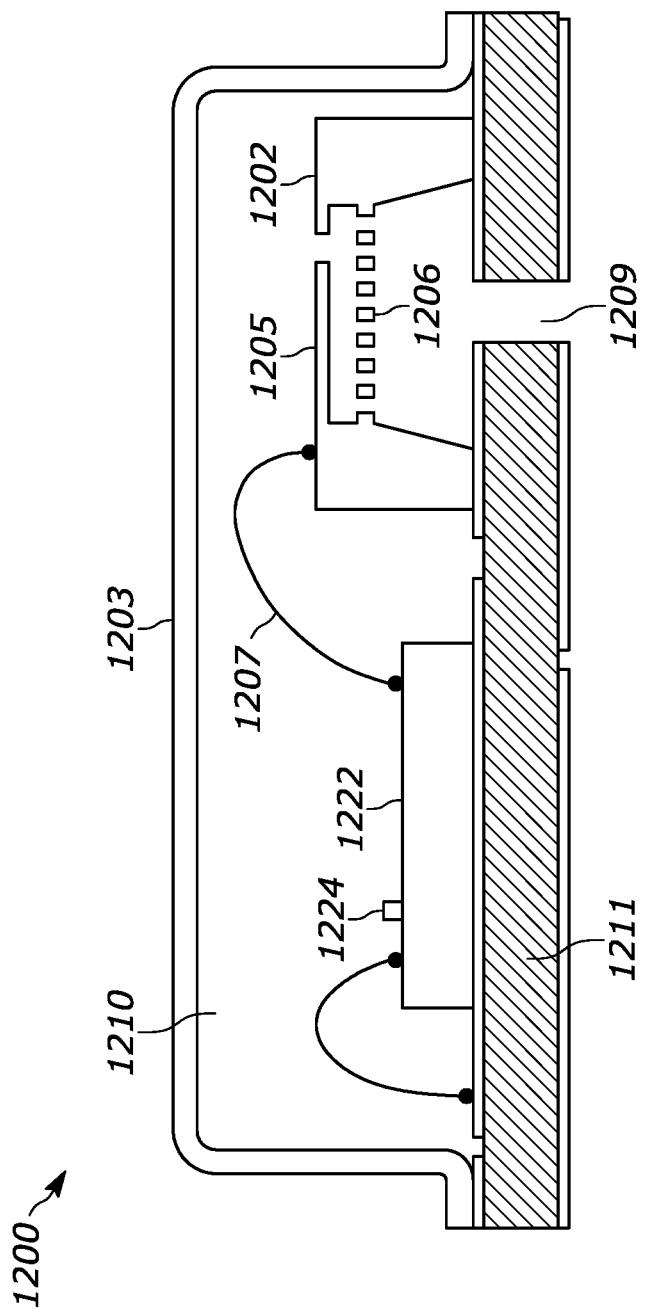
FIG. 12 shows an exemplary embodiment of a microphone assembly or system in accordance with various embodiments.

FIG. 12 shows an exemplary embodiment of a microphone assembly or system 1200. In some embodiments, the microphone assembly 1200 can be used to implement the microphone devices discussed above in relation to FIGS. 1A-11. The microphone assembly 1200 includes a transducer 1202, such as a MEMS transducer, configured to convert sensed pressure changes into a corresponding electrical signal. The transducer 1202 may, for example, exhibit a transducer capacitance between 0.5 pF and 10 pF. The transducer 1202 may include first and second mutually charged transducer plates, e.g. a diaphragm 1205 and back plate 1206, respectively, supplying the electrical signal. The microphone assembly 1200 additionally includes a processing circuit 1222, which may include a semiconductor die, for example a mixed-signal CMOS semiconductor device integrating the various analog and digital circuits discussed above. The microphone assembly 1200 can also include a temperature sensor 1224 that measures the ambient temperature and provides a temperature value (in terms of a voltage/current or a digital value) to the processing circuit 1222. Bonding wires 1207 can connect the transducer 1202 to the processing circuit 1222. The processing circuit 1222 is shaped and sized for mounting on a substrate or carrier element 1211 of the microphone assembly 1200, where the carrier element likewise supports the transducer 1202. The microphone assembly 1200 includes a housing lid 1203 mounted onto a peripheral edge of the substrate or carrier element 1211 such that the housing lid 1203 and carrier element 1211 jointly form a microphone housing enclosing and protecting the transducer 1202 and the processing circuit 1222 of the microphone assembly 1200. The microphone housing may include an inlet or port 1209 projecting through the carrier element 1211, or through the housing lid 1203 in other embodiments, for conveying pressure changes to the transducer 1202.

In one or more embodiments, the carrier element 1211 can include one or more interconnects outside of the housing lid 1203 to send and receive electrical signals to and from the processing circuit 1222. For example, the interconnects can implement the data line 1104 and the clock line 1106 shown in FIG. 11.

Figure 13:
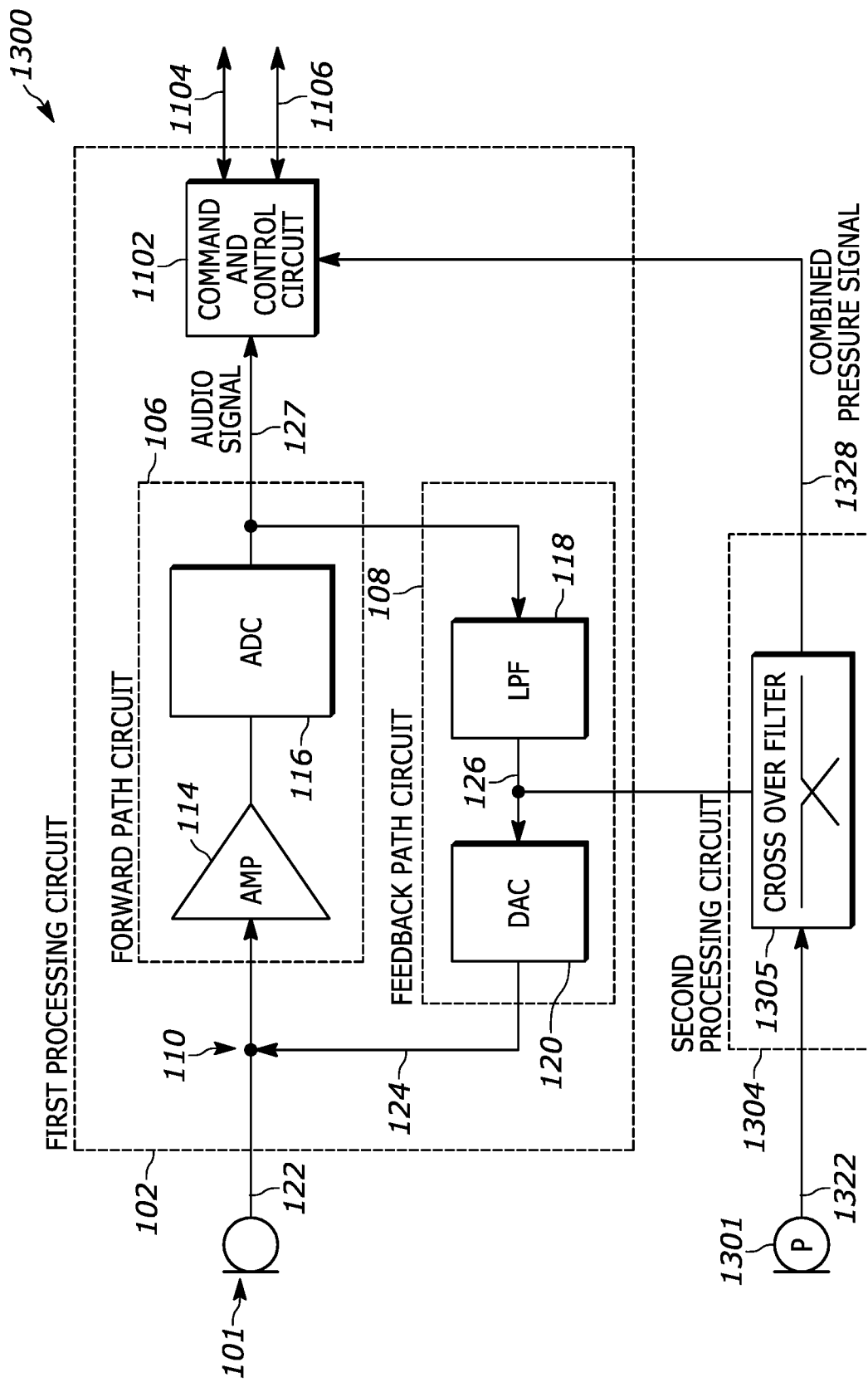
FIG. 13 shows a block diagram of a third example microphone device in accordance with various embodiments.

FIG. 13 shows a block diagram of a third example microphone device 1300. The third example microphone device 1300 includes several components that are common with the components of the first and the second example microphone devices 100 and 1100 discussed above in relation to FIGS. 1 and 11, and such common components have been labeled with like reference numerals. In contrast with the first and the second example microphone devices 100 and 1100, the third example microphone device 1300 includes a pressure sensor 1301. The pressure sensor 1301 can measure pressure changes in a frequency range that is below the frequency range of the transducer 101. For example, the pressure sensor 1301 can be configured to be sensitive to changes in pressure in the frequency range of about 0 Hz (absolute pressure) to about 1 Hz, where the transducer 101 is configured to be sensitive to changes in pressure in the frequency range of about 1 Hz to about 20 kHz. In some embodiments, the pressure sensor 1301 can be configured to be sensitive to pressure changes at all frequencies below the lowest frequency for which the transducer 101 is configured to be sensitive. In one or more embodiments, the pressure sensor 1301 can be implemented using a piezo resistive pressure sensor or a capacitive pressure sensor.

The pressure sensor 1301 can sense the changes in pressure (or the absolute pressure) and generate a pressure sensor electrical signal 1322, which is provided to the second processing circuit 1304. The second processing circuit 1304 can include at least one of an amplifier, an analog-to-digital converter, and a buffer to process the pressure sensor electrical signal 1322. The second processing circuit 1304 can receive the low pass filter signal 126 generated by the loop filter 118. As discussed above, the low pass filter signal 126 can include low frequency components of the electrical signal generated by the transducer 101. The low frequency components included in the low pass filter signal 126 include frequency components down to a cut-off frequency of the transducer 101. For example, as discussed above, if the cut-off frequency of the transducer 101 is about 1 Hz, then the low pass filter signal 126 may include frequency components down to 1 Hz. The second processing circuit 1304 includes a cross-over filter circuit 1305 that combines the low pass filter signal 126 and the pressure sensor electrical signal 1322 (which, for example, may be processed by one of the amplifier, the analog-to-digital converter, or the buffer discussed above) to generate a combined pressure signal 1328. In particular, the cross-over filter 1305 can combine the frequency components from the pressure sensor electrical signal 1322 and the frequency components from the low pass filter signal 126 to generate the combined pressure signal 1328, which can now include frequency components down to about 0 Hz. This is in contrast with the low frequency pressure signal 128 discussed above in relation to FIG. 1A, which includes frequency components down only to the cut-off frequency of the transducer 101. As a result, the third example microphone device 1300 is capable of sensing pressure changes down to absolute pressure.

Figure 14:
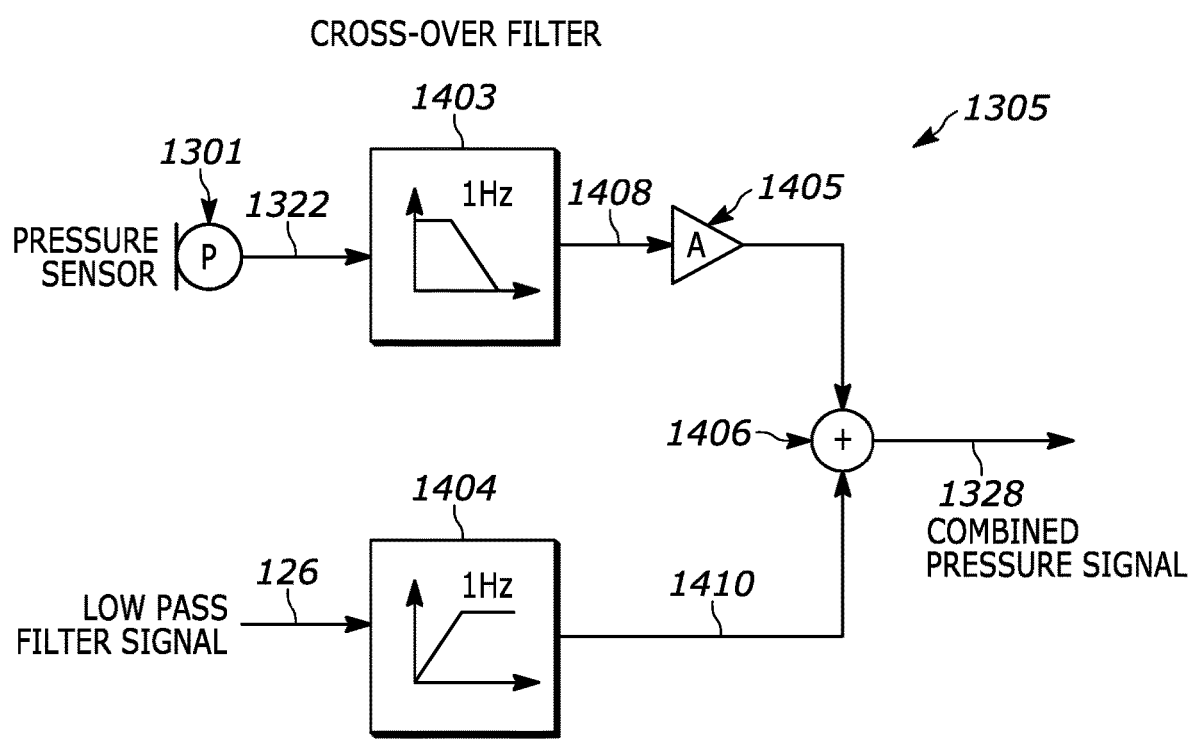
FIG. 14 shows a block diagram of a cross-over filter circuit shown in FIG. 13 in accordance with various embodiments.

FIG. 14 shows a block diagram of a cross-over filter circuit 1305, shown in FIG. 13. In particular, the cross-over filter 1305 can include a first filter 1403, a second filter 1404, an amplifier 1405, and a summer 1406. The pressure sensor electrical signal 1322 is provided to the first filter 1403 while the low pass filter signal 126 is provided to the second filter 1404. The first filter 1403 is a low pass filter while the second filter 1404 is a high pass filter. Both the first and the second filters 1403 and 1404 can be configured to have their respective cut-off frequencies be equal to the cut-off frequency of the transducer 101. For example, if the cut-off frequency of the transducer 101 is set at 1 Hz, then the cut-off frequencies of the first and the second filters 1403 and 1404 can be set at 1 Hz. In some embodiments, the cut-off frequency of the first filter 1403 can be different from the cut-off frequency of the second filter 1404. The first filter 1403 filters the pressure sensor electrical signal 1322 to pass all frequency components below the cut-off frequency and generate a first filter output signal 1408. Likewise, the second filter filters the low pass filter signal 126 to pass all frequency components above the cut-off frequency and generate a second filter output signal 1410. The amplifier 1405 can optionally amplify the first filter output signal 1408 before providing the first filter output signal 1408 to the summer 1406. While not shown in FIG. 14, an amplifier may also be employed to amplify the second filter output signal 1410 before being fed to the summer 1406. A gain 'A' of the amplifier 1405 can be selected such that the average amplitude of the first filter output signal 1408 is substantially equal to the average amplitude of the second filter output signal 1410. The summer 1406 adds the first filter output signal 1408 and the second filter output signal 1410 to generate the combined pressure signal 1328.

In some embodiments, the second processing circuit 1304 can also include compensation circuits for compensating for non-linearity of each of the transducer 101 and the pressure sensor 1301. For example, the second processing circuit can include a compensation circuit that compensates the pressure sensor electrical signal 1322 for non-uniform gain of the pressure sensor 1301 over changes in frequency and temperature, in a manner similar to that discussed above in relation to the compensation circuit 112 shown in FIG. 1A. In some embodiments, pressure sensor electrical signal 1322 and the low pass filter signal 126 can be compensated by their respective compensation circuits before being provided to the first filter 1403 and the second filter 1404.

The third example microphone device 1300 discussed above in relation to FIGS. 13 and 14 allows for a significant reduction in size of the pressure sensor 1301 compared to other microphone devices. For example, some microphone devices include both an acoustic transducer and a pressure sensor. The acoustic transducer is configured to have a cut-off frequency of about 20 Hz, or about the lower end of the audible frequency range. The pressure sensor in such microphone devices is used to measure pressure changes in the frequency range of about 0 Hz to about 20 Hz. For such a pressure sensor to have high resolution over the entire frequency range, the pressure sensor has a large size, in the order of about 1 sq. mm. In contrast, the third example microphone device 1300 uses a pressure sensor 1301 that needs to measure a frequency range of only up to about 1 Hz. The remainder of the frequency range, between 1 Hz and 20 Hz, is instead measured by the transducer 101, which is also used to sense pressure changes in the audible frequency range. This reduction in the range of frequency to be measured by the pressure sensor 1301 results in a pressure sensor 1301 configured with relatively lower resolution. This, in turn, results in a reduction in the size needed for the pressure sensor 1301. In some embodiments, the pressure sensor 1301 can have a size of only about 0.1 sq. mm. A reduction in size of the pressure sensor 1301 can allow a reduction in the size of the package that houses the third example microphone device 1300.

Figure 15:
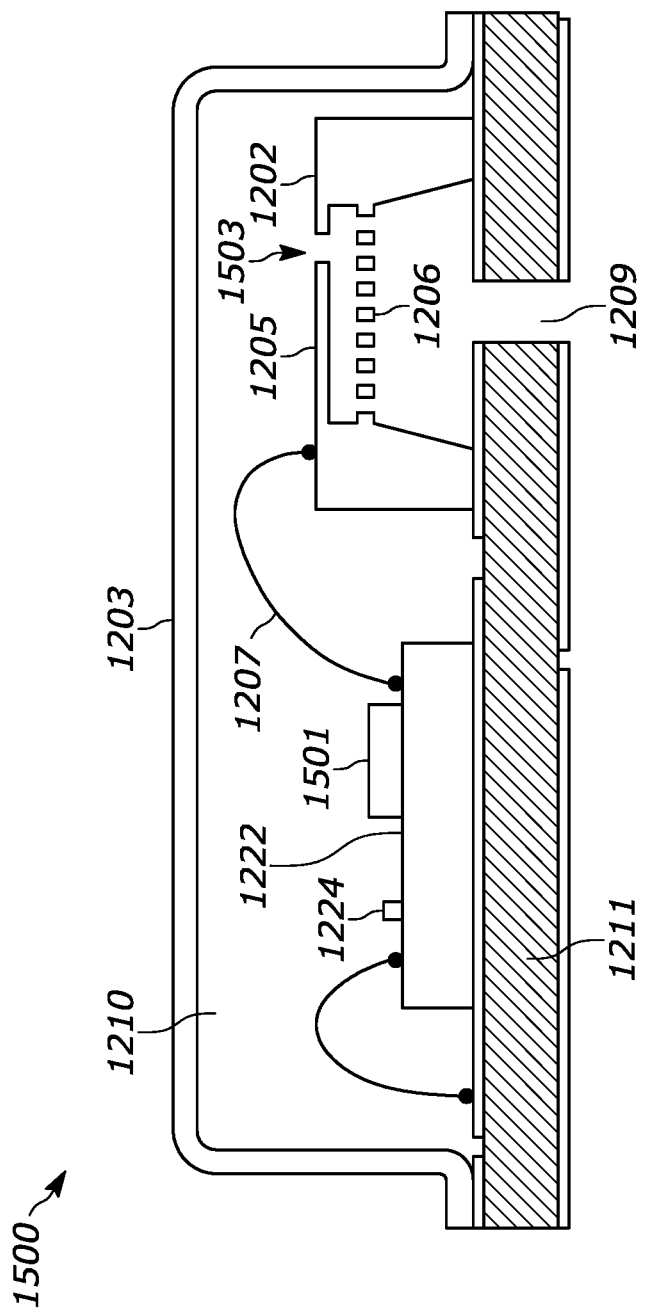
FIG. 15 shows an exemplary embodiment of a microphone assembly or system in accordance with various embodiments.

FIG. 15 an exemplary embodiment of a microphone assembly or system 1500. The microphone assembly 1500 shown in FIG. 15 is similar in many respects to the microphone assembly 1200 discussed above in relation to FIG. 12. To that extent, like components have been referred to with like reference numbers. The microphone assembly 1500 also includes a pressure sensor 1501 for measuring pressure changes at very low frequencies. For example, the pressure sensor 1501 can be used to implement the pressure sensor 1301 discussed above in relation to FIG. 13. For example, the pressure sensor 1501 can be configured to be sensitive to changes in pressure in the frequency range of about 0 Hz to about 1 Hz. In some embodiments, the pressure sensor 1501 can be configured to be sensitive to changes in pressure in the frequency range that is below the frequency range for which the transducer 1202 is configured to be sensitive.

In some embodiments, the diaphragm 1205 of the transducer 1202 can include a vent 1503 that allows passage of air between the back volume 1210 and the outside of the microphone assembly 1500. The size (e.g., diameter or surface area) of the vent 1503 can be selected to set a cut-off frequency of the transducer 1202. For example, the size of the vent 1503 can be selected such that the cut-off frequency of the transducer 1202 is about 1 Hz. This means that the transducer 1202 is sensitive primarily to the changes in pressure that have a frequency above 1 Hz. Frequencies below 1 Hz can pass through the diaphragm 1205 and be incident on the pressure sensor 1501. The vent 1503 sets a cut-off frequency, where frequencies above the cut-off frequency are sensed by the transducer 1202 and the frequencies below 1 Hz are sensed by the pressure sensor 1501. In some such embodiments, the vent 1503 can be seen as an electrical circuit acoustic filter, and in particular as acoustically implementing a cross-over filter (such as the electronic cross-over filter 1305 shown in FIGS. 13 and 14), and the second processing circuit 1304 may not need to implement the cross-over filter 1305. The size of the vent can be configured to set the cut-off frequency at frequencies other than 1 Hz, such as for example, at frequencies between about 0.1 Hz to about 1 Hz. In some embodiments, the diaphragm 1205 may not have a vent, thereby impeding the pressure changes from being incident on the pressure sensor 1501. In some such embodiments, the pressure sensor 1501 may be positioned between the port 1209 and the diaphragm 1205, so that the pressure sensor 1501 can faithfully measure any changes in pressure. In some embodiments, the transducer 1202 can include an electronic filter that electronically sets the frequency of the transducer 1202 to the desired cut-off frequency. In some such embodiments, the electronic filter can include an analog filter, such as a first order or second order analog filter formed using passive components (such as for example, resistors and capacitors), active components (such as for example, transistors and operational amplifiers) or a combination thereof.

Figure 16:
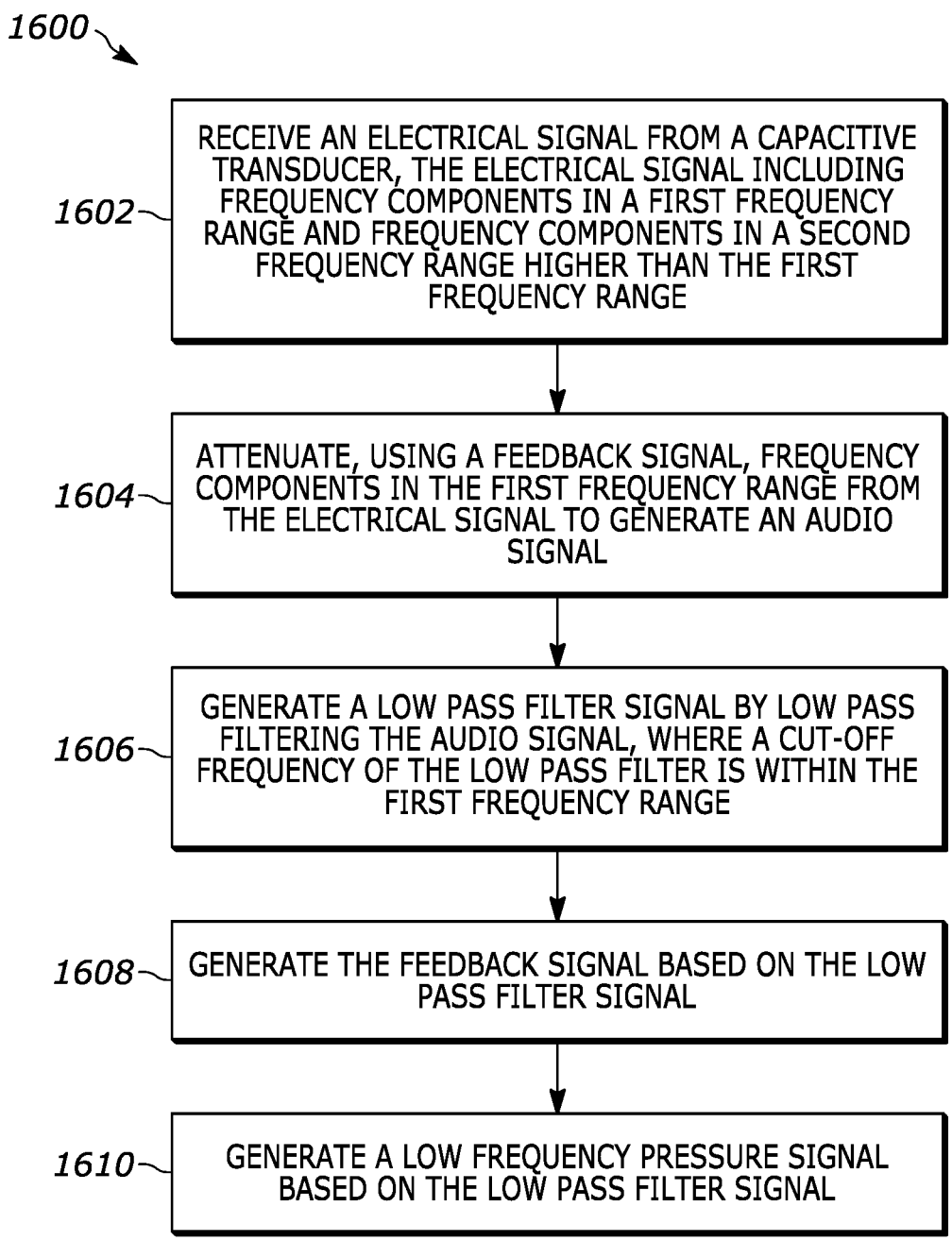
FIG. 16 shows a flow diagram of a process for generating a low frequency pressure signal and an audio signal in a microphone device in accordance with various embodiments.

FIG. 16 shows a flow diagram of a process 1600 for generating a low frequency pressure signal and an audio signal in a microphone device. The process 1600 can be executed by one or more circuits and/or signal processors included in a microphone device, such as the microphone device shown in FIGS. 1A, 11, and 13.

The process 1600 includes receiving an electrical signal from a transducer, the electrical signal including frequency components in a first frequency range and frequency components in a second frequency range higher than the first frequency range (stage 1602). At least one example of this process stage has been discussed above in relation to FIGS. 1A, 11, and 13. For example, as shown in FIGS. 1A, 11, and 13, the first processing circuit 102 receives an electrical signal 122 generated by the transducer 101. As shown in FIG. 1B, the electrical signal can include frequency components in the first frequency range and frequency components in the second frequency range. The first frequency range can include frequencies, for example, between about 0 Hz to about 20 Hz, and the second frequency range can include frequencies, for example, between about 20 Hz to about 20 kHz.

The process 1600 includes attenuating, using a feedback signal, frequency components in the first frequency range from the electrical signal to generate an audio signal (stage 1604). As discussed above in relation to FIGS. 1A, 11, and 13, the feedback signal 124 can be used to suppress or attenuate frequency components in the first frequency range from the electrical signal 122 to generate an audio signal. The feedback signal 124 can be provided by the feedback path circuit 108 and can include frequency components that correspond to the frequency components in the first frequency range included in the electrical signal 122.

The process 1600 includes generating a low pass filter signal by low pass filtering the audio signal where a cut-off frequency of the low pass filter is within the first frequency range (stage 1606). As discussed above in relation to FIGS. 1A, 11, and 13, the feedback path circuit 108 can provide the audio signal 127 to a LF 118, where the LF 118 can have a cut-off frequency that is equal to a highest frequency in the first frequency range. The LF 118 can generate a low pass filter signal 126 that includes the frequency components in the first frequency range that appear in the audio signal 127. In some embodiments, the characteristics of the LF 118, such as the cut-off frequency, the roll-off rate, the attenuation, etc., can be programmable by programming the values of the filter coefficients of the LF 118. As discussed in relation to FIGS. 11 and 13, the appropriate values of the filter coefficients of the LF 118 can be received via the command and control circuit 1102.

The process 1600 also includes generating the feedback signal based on the low pass filter signal (stage 1608). As discussed above in relation to FIG. 2, the feedback path circuit includes a DAC 120 that converts the low pass filter signal 126 into a feedback signal 124, which is provided to the summing node 110. The DAC 120 can convert the digital low pass filter signal 126 into an analog feedback signal 124, which can be used to attenuate frequency components in the first frequency range from the electrical signal generated by the transducer 101. The generation of the feedback signal 124 and the attenuation of the frequency components in the first frequency range from the electrical signal generated by the transducer 101 is discussed above in relation to FIGS. 2-9B.

The process 1600 also includes generating a low frequency pressure signal based on the low pass filter signal (stage 1610). As discussed above in relation to FIGS. 1A, 10, 11, and 13, the second processing circuit 104 can include a compensation circuit 112 that can process the low pass filter signal 126 to generate the low frequency pressure signal 128. The low frequency pressure signal 128 can include frequency components in the first frequency range.

The process 1600 may also include generating the low frequency pressure signal based on a pressure sensor signal generated by a pressure sensor included in the microphone device in addition to the transducer. As discussed above in relation to FIGS. 13-15, the second processing circuit 1304 can include a cross-over filter 1305 that can combine the pressure sensor electrical signal 1322 generated by the pressure sensor 1301 with the low pass filter signal 126 to generate a combined pressure signal 1328.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A sensor device comprising:
   a transducer configured to generate an electrical signal responsive to sensed pressure changes, the electrical signal including frequency components;
   a forward path circuit having an input coupled to the transducer and configured to receive and condition the electrical signal received from the transducer and provide the conditioned signal at an output of the forward path circuit;
   a feedback circuit including a low pass filter, the feedback circuit configured to generate a feedback signal based on a low pass signal from the low pass filter;
   a summing node configured to attenuate the frequency components based on the feedback signal before the electrical signal is provided to the input of the forward path circuit; and
   a pressure sensing circuit configured to generate an output signal based in part on the low pass signal from the low pass filter of the feedback circuit, the output signal of the pressure sensing circuit representative of changes in subsonic pressure sensed by the transducer,
   wherein the transducer is a micro-electromechanical systems (MEMS) transducer.

2. The sensor device of claim 1, wherein the transducer includes an acoustic filter having a high pass cut-off frequency below 1 Hz.

3. The sensor device of claim 1, wherein the feedback circuit constitutes part of an electronic filter having a high-pass cut-off frequency of about 0.1 Hz.

4. The sensor device of claim 1, the forward path circuit includes an analog-to-digital converter configured to convert the electrical signal to a digital signal, the low pass filter is configured to generate the low pass signal based on the digital signal, and the feedback circuit includes a digital-to-analog converter coupled to an output of the low pass filter, wherein the digital-to-analog converter is configured to convert the feedback signal to an analog feedback signal.

5. The sensor device of claim 4, wherein the analog feedback signal is a current signal and wherein the summing node is configured to add or subtract charge corresponding to the analog feedback signal to or from the electrical signal.

6. The sensor device of claim 1, wherein the frequency components are below a human audible frequency range.

7. The sensor device of claim 1, the output of the pressure sensing circuit including frequency components in a frequency range down to about 0 Hz.

8. The sensor device of claim 7, wherein the pressure sensing circuit includes a high pass filter configured to filter the low pass signal, the frequency components include frequency components in a first frequency range and frequency components in a second frequency range higher than the first frequency range, and wherein the low pass filter and the high pass filter have a common cut-off frequency equal to a lowest frequency in the first frequency range.

9. A microphone assembly comprising:
   a microelectromechanical systems (MEMS) transducer configured to generate an electrical signal in response to detecting changes in air pressure, the electrical signal including frequency components in a first frequency range and frequency components in a second frequency range, the second frequency range higher than the first frequency range; and
   an electrical circuit including:
   a first processing circuit, including:
   a forward path circuit having an input coupled to an output of the MEMS transducer, an analog to digital (A/D) converter configured generate a digital signal based on the electrical signal the forward path circuit having an output coupled to an external interface of the microphone assembly, the forward path circuit configured to output an audio signal at the external interface based on the electrical signal applied to the input of the forward path circuit;
   a feedback path having a feedback filter having an input coupled to the forward path circuit and configured to filter the digital signal of the forward path circuit; and
   a compensation circuit coupled to an output of the feedback filter, wherein the compensation circuit is configured to cancel frequency components of the electrical signal in the first frequency range based on a feedback filter output signal of the feedback filter, the cancellation occurring before the electrical signal is applied to the input of the forward path circuit, and
   a second processing circuit configured to generate an external output signal at the external interface based on the digital signal of the forward path circuit, wherein the external output signal of the second processing circuit is indicative of a characteristic of atmospheric pressure measured by the MEMS transducer.

10. The assembly of claim 9, further comprising a digital-to-analog converter disposed between the output of the feedback filter and an input to the compensation circuit, wherein the compensation circuit includes a summing circuit configured to subtract a signal based on the output signal of the feedback filter from the electrical signal before the electrical signal is input to the forward path circuit.

11. The assembly of claim 10, wherein the second processing circuit is configured to compensate for a change in a sensitivity of the MEMS transducer due to changes in temperature or changes in frequency of the changes in air pressure.

12. The assembly of claim 10, wherein the second processing circuit configured to generate the external output signal based on the digital signal of the forward path circuit and the feedback filter output signal of the feedback filter.

13. The assembly of claim 10, the MEMS transducer is a capacitive sensor having a high pass acoustic filter with a cutoff frequency below 0.1 Hz, wherein the external output signal of the second processing circuit is indicative of a change in atmospheric pressure measured by the MEMS transducer.

14. The assembly of claim 13, wherein the second processing circuit is configured to compensate for reduced sensitivity of the MEMS transducer at frequencies below the cutoff frequency.

15. The assembly of claim 13, wherein the second processing circuit includes a shelving filter configured to compensate for attenuation of the electrical signal at frequencies below the cutoff frequency.

16. The assembly of claim 9,
wherein the external interface comprises an external device interface, and
wherein the assembly further comprises a housing having the external-device interface with electrical contacts, the MEMS transducer and the electrical circuit disposed at least partially in the housing and the output of the electrical circuit coupled to at least one of the electrical contacts.

17. The assembly of claim 9, the MEMS transducer is devoid of an acoustic filter, wherein the external output signal of the second processing circuit is indicative of absolute atmospheric pressure measured by the MEMS transducer.

18. The assembly of claim 9, wherein the frequency components in the first frequency range are below a human audible frequency range, and wherein the second frequency range includes human audible frequencies.

19. The sensor device of claim 1, wherein the output of the forward path circuit is coupled to an external interface, where the forward path circuit outputs the conditioned signal as an audio signal at the external interface.

* * * * *